(12) United States Patent
Enlow et al.

(10) Patent No.: US 6,296,732 B1
(45) Date of Patent: *Oct. 2, 2001

(54) EXTRUSION PROCESS FOR PROTECTIVE COATINGS FOR OUTDOOR SIDING PANELS AND THE LIKE

(75) Inventors: Howard H. Enlow, Munster, IN (US); Russell J. McCready, LaVerne, CA (US); John E. Roys, Lowell, IN (US); Keith L. Truog, Crown Point, IN (US); Frederick Young, Schererville, IN (US)

(73) Assignee: Avery Dennison Corporation, Pasadena, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/973,768
(22) PCT Filed: Jun. 7, 1996
(86) PCT No.: PCT/US96/09953
§ 371 Date: Feb. 27, 1998
§ 102(e) Date: Feb. 27, 1998
(87) PCT Pub. No.: WO96/40519
PCT Pub. Date: Dec. 19, 1996
(51) Int. Cl.$^7$ ............................. B29C 47/00; B32B 31/30
(52) U.S. Cl. ................ 156/209; 156/244.16; 156/244.27
(58) Field of Search .................... 156/209, 244.16, 156/244.27

(56) References Cited

U.S. PATENT DOCUMENTS

| | | | |
|---|---|---|---|
| 3,880,690 | 4/1975 | Fuchs et al. | 156/242 |
| 4,007,067 | 2/1977 | Dunning | 156/61 |
| 4,268,464 * | 5/1981 | Yoshino et al. | 264/22 |

(List continued on next page.)

FOREIGN PATENT DOCUMENTS

| | | |
|---|---|---|
| 4228194 A1 | 3/1994 | (DE) . |
| 0 356 924 A2 | 3/1990 | (EP) . |

(List continued on next page.)

OTHER PUBLICATIONS

"Long–Term Photoprotection of Polymers by Coextrusion with PVDF" by Albert Strassel, 1989.

* cited by examiner

Primary Examiner—Michael W. Ball
Assistant Examiner—Barbara J Musser
(74) Attorney, Agent, or Firm—Christie, Parker & Hale, LLP

(57) ABSTRACT

A process for making a protective and decorative surfacing film comprises extrusion coating a solid polymeric material from an extruder die to form an optically clear first layer of uniform film thickness on a smooth surface of a carrier sheet traveling continuously past the extruder die opening. The extrusion coated first layer is immediately cooled on the carrier sheet to harden it, followed by applying a pigmented second layer in thin film form to the first layer to form a composite paint coat in which the first and second layers are bonded to each other. The composite paint coat is then transferred to a supportive backing sheet or substrate panel, after which the carrier sheet is separated from the paint coat, to expose the outer surface of the first layer as a high gloss surface with a high distinctness-of-image, providing a transparent protective outer coat for the underlying pigmented second layer. The pigmented second layer can be solvent cast and dried or extruded and hardened as a separate coating on the extrusion coated first layer. Alternatively, the second layer can be formed with the first layer as a coextrusion which is extrusion coated onto the smooth surface of the release coated carrier sheet that travels past the extruder die.

61 Claims, 10 Drawing Sheets

U.S. PATENT DOCUMENTS

| | | | |
|---|---|---|---|
| 4,317,860 | 3/1982 | Strassel | 428/421 |
| 4,364,886 | 12/1982 | Strassel | 264/171 |
| 4,415,519 | 11/1983 | Strassel | 264/171 |
| 4,427,825 | 1/1984 | Degrassi et al. | 525/56 |
| 4,440,702 | 4/1984 | Susnjara | 264/37 |
| 4,500,706 | 2/1985 | Mathis et al. | 528/502 |
| 4,810,540 | 3/1989 | Ellison et al. | 428/31 |
| 4,832,991 | 5/1989 | Hayward et al. | 427/393.5 |
| 4,854,995 * | 8/1989 | Kasper et al. | 156/243 |
| 4,877,683 | 10/1989 | Bragaw, Jr. et al. | 428/421 |
| 4,902,557 | 2/1990 | Rohrbacher | 428/215 |
| 4,931,324 | 6/1990 | Ellison et al. | 428/31 |
| 4,936,936 | 6/1990 | Rohrbacher | 156/239 |
| 4,959,189 | 9/1990 | Rohrbacher et al. | 264/510 |
| 5,030,394 | 7/1991 | Sietses et al. | 264/28 |
| 5,114,789 | 5/1992 | Reafler | 428/328 |
| 5,164,245 | 11/1992 | Suzuki | 428/201 |
| 5,203,941 | 4/1993 | Spain et al. | 156/209 |
| 5,455,073 | 10/1995 | Dethlefs et al. | 427/296 |
| 5,707,697 | 1/1998 | Spain et al. | 428/31 |
| 5,985,079 | 11/1999 | Ellison | 156/244.23 |

FOREIGN PATENT DOCUMENTS

| | | |
|---|---|---|
| 0459720A1 * | 12/1991 | (EP) . |
| 1 225 438 | 3/1971 | (GB) . |
| 2084513A | 4/1982 | (GB) . |
| 618349 | 1/1986 | (JP) . |
| 62138213 | 6/1987 | (JP) . |
| 11536 | 6/1994 | (JP) . |
| WO8807416 | 10/1988 | (WO) . |
| WO 91/05660 | 5/1991 | (WO) . |
| WO9403337 | 2/1994 | (WO) . |

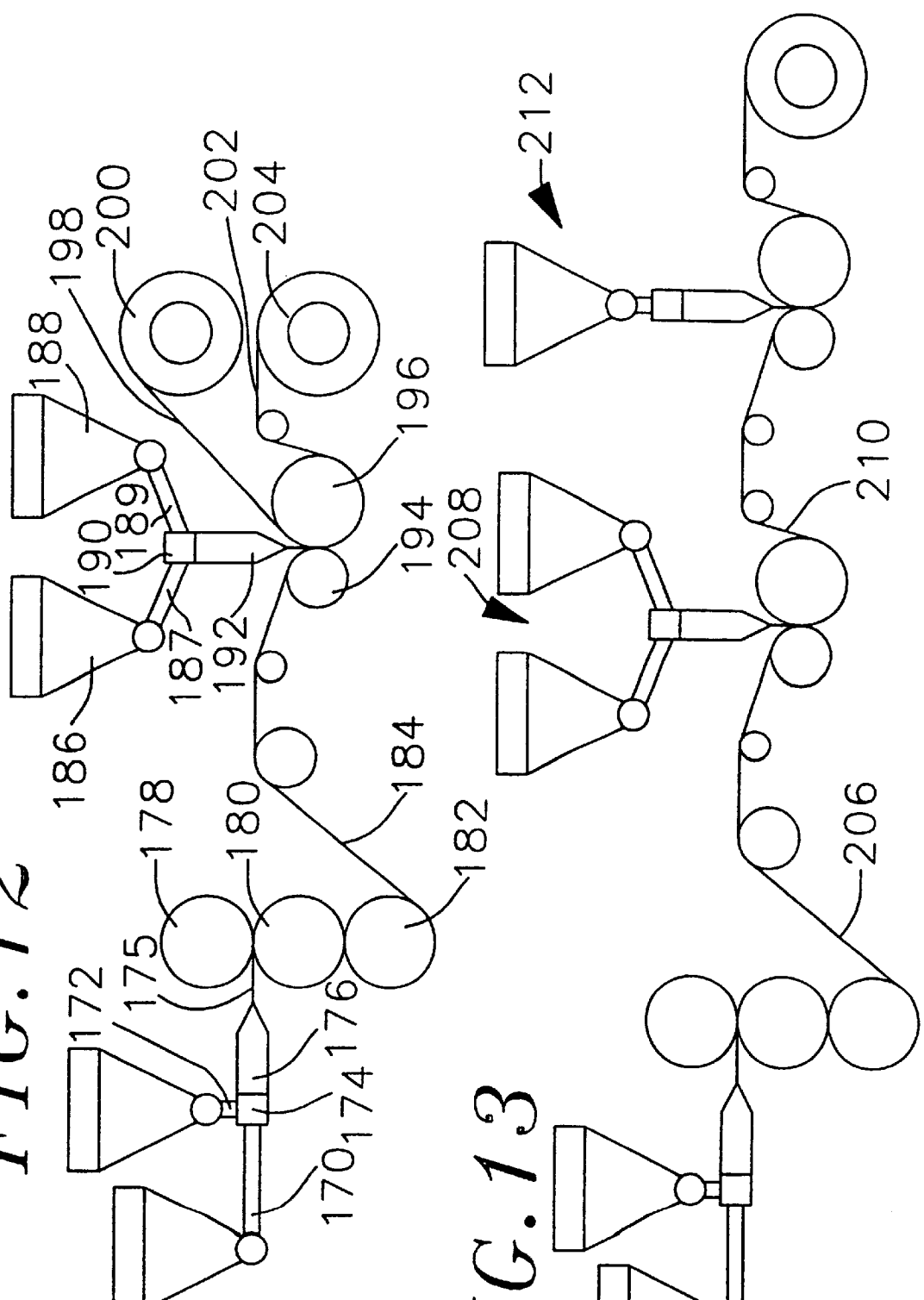

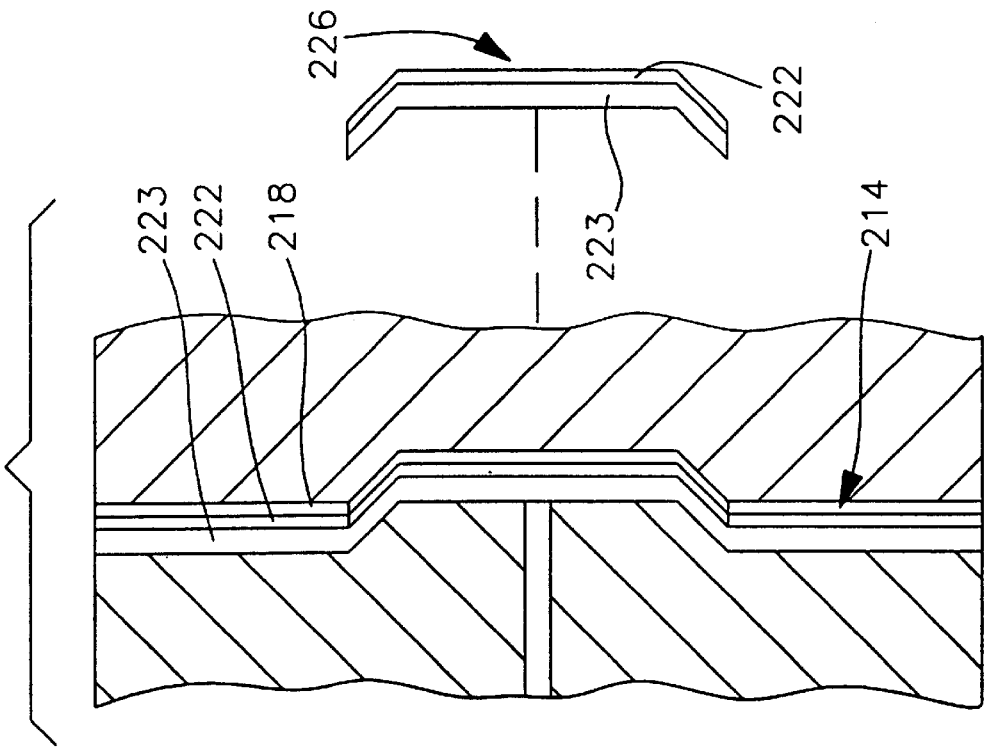
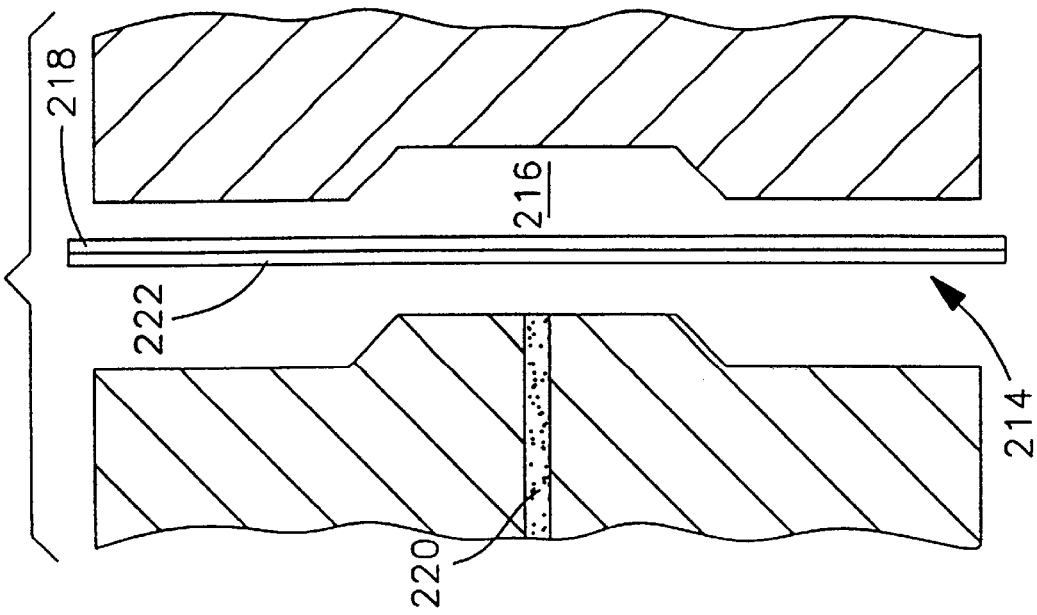

- CARRIER
- MATTE RELEASE
- TOP COAT
- PRINT COAT 1
- PRINT COAT 2
- COLOR COAT 1
- COLOR COAT 2
- SIZE

- TOP COAT
- PRINT COAT 1
- PRINT COAT 2
- COLOR COAT 1
- COLOR COAT 2
- SIZE
- EXTRUDED FILM

EXTRUSION PROCESS FOR PROTECTIVE COATINGS FOR OUTDOOR SIDING PANELS AND THE LIKE

FIELD OF THE INVENTION

This invention relates generally to the use of extrusion coating techniques for forming multilayer paint coated films. More particularly, multilayer coatings are made by extrusion coating one or more layers onto a surface-controlled plastic carrier sheet to produce high quality films at high speeds while avoiding solvent emission problems characteristic of the use of solvent-based paints.

BACKGROUND OF THE INVENTION

1. Exterior Automotive Applications

Exterior automotive body panels have been made in the past by spray painting sheet metal parts. Multilayer paint coats, such as those referred to as a clear coat/color coat paint finish, have been used to produce desirable optical effects. In addition to high gloss and high distinctness-of-image (DOI), these paint coats also are highly durable by providing chemical resistance, abrasion resistance and weatherability that avoids degradation by ultraviolet light.

In more recent years molded plastic car body panels have been made with decorative clear coat/color coat paint films bonded to the molded plastic panel. Use of such films avoids certain environmental problems associated with evaporation of paint solvents while also reducing or eliminating the need for paint facilities and emission controls at the automotive production plant.

Because of the growing need to reduce the amount of atmospheric pollution caused by solvents emitted during the painting process, many different approaches have been taken in recent years for producing these decorative films. These processes are generally categorized by solution casting techniques or extrusion techniques. For instance, U.S. Pat. Nos. 4,810,540 to Ellison et al., and 4,902,557 to Rohrbacher use solution casting techniques in which liquid-cast, solvent-based clear coats and pigmented base coats are applied to a flexible casting sheet by a coating process such as reverse roll coating or gravure printing. The liquid cast layers are separately applied and then dried at high temperatures to evaporate the solvents.

As an alternative, extruded films have been used for making exterior automotive clear coat/color coat films. International application PCT US93 07097 to Duhme describes an approach in which paint films are made by coextruding a base coat and a clear coat as separate extruded layers onto a carrier sheet The carrier is used as a supporting sheet for the clear coat and color coat in a subsequent injection molding process. The extruded clear coat and color coat are supported in the mold by the carrier and shaped in the mold. The clear coat is a coextruded sheet having different proportions of polyvinylidene fluoride (PVDF) and acrylic resins in each layer of the coextusion.

U.S. Pat. Nos. 4,317,860 and 4,364,886 to Stassel also disclose coextrusion of multilayer films such as a two-layer coextrusion of predominantly PVDF on one side and a predominantly acrylic resin on the other side of the extruded sheet. These unitary structures are used to make molded articles, or to adhere the sheets to a molded polymer.

Film extrusion techniques also have been used in the past for making free films in which the extruded polymeric material is coated on a polished drum. These films are then undercoated with various color coats. The exterior surface of the extruded free film that contacts the drum (and is separated from the drum as a free film) does not have a high gloss and distinctness-of-image. Also films manufactured in this manner do not have a carrier sheet attached, which makes them hard to handle and easily damaged in subsequent processing.

Another approach disclosed in U.S. Pat. No. 5,114,789 to Reafler comprises a pigmented base coat which is solvent-die extrusion coated onto a flexible, stretchable carrier sheet and dried at elevated temperatures to evaporate solvents, followed by extrusion coating a reactive clear coat on the base coat. The carrier film and extrusion coated paint layers are then heat softened as a unitary sheet and applied to a molded shaped substrate by a shrink wrap process.

In a currently used process for making exterior automotive films, a clear coat and color coat comprising blends of PVDF and acrylic resins are cast by reverse roll coater, either by solution or dispersion casting. The film thickness of the paint coats used in the process generally is dictated by end user requirements. In some instances the need to produce relatively thick films can impose certain production constraints. To adequately dry the material and to prevent air entrapment, line speeds are typically at 25 feet per minute. This slow throughput limits the coating capacity of the reverse roll coater and also releases a large amount of organic solvents. This solvent release is particularly evident when a solution-cast PVDF/acrylic clear coat is coated from a solvent-based solution having a relatively high amount of solvent. VOC emissions are high. PVDF has limited solubility and requires strong solvents to dissolve. One such solvent known as N-methyl pyrrolidone (trade name M-Pyrol) is needed to solubilize the resin in solution casting or can be used as a coalescing aid in dispersion casting. In addition, cross contamination can occur from solubilizing residual material in previously used drums, hoses, pans, pumps, etc. Also, during coating, the strong solvent can dissolve caked-on resins in a drying oven, causing them to cascade down on the web being coated. As a further concern, these strong solvents are expensive.

Thus, there is a need for producing decorative and protective surfacing films while avoiding the adverse effects of low production line speed, high VOC, cross-contamination, and the use of expensive solvents. Extrusion techniques can be an alternative that avoids the use of strong solvents and their related solvent emission problems. Extrusion techniques such as those described above, however, have not been successfully adapted to producing high quality films at high line speeds and at low cost.

The present invention provides an extrusion coating process that is an alternative to solution or dispersion casting of polymeric films and conventional extrusion. The invention is particularly useful with PVDF/acrylic films while avoiding use of the strong solvents and their related problems described previously. Use of the extrusion coating techniques of this invention provides the advantages of avoiding expensive solvents, producing no VOC emissions, and avoiding cross-contamination associated with solvent casting. In addition, and as emphasized in more detail below, the present invention has the added advantage of greatly increasing line speed, eiminating steps in the manufacturing process, and reducing costs for producing the clear coat/color coat films.

Further, the invention has particular applicability to the manufacture of molded plastic exterior automotive body panels and parts. The invention provides a means for producing high gloss, high DOI clear coat/color coat paint films of exterior automotive quality.

2. Exterior Siding Panel Applications

Although the invention is described above with respect to exterior automotive applications, the invention also has applicability as a protective and decorative coating for other articles such as interior automotive components, exterior siding panels and related outdoor construction products, marine products, sign age, and other interior or exterior film products with similar constructions.

The following description relating to vinyl (PVC) siding panels is an example of one use of the invention for producing outdoor weather able decorative surfaces on extruded plastic sheets. The invention, however, is applicable to plastic substrate panels other than vinyl.

Wood, metal and vinyl are materials commonly used as boards or shingles for siding in the construction and remodeling of commercial and residential structures. Painted wood is perhaps the most aesthetically pleasing of these materials to the consumer, but wood suffers from deterioration by rotting and attack by insects, rodents and birds. Wood surfaces need constant re-protection with paint, stains and water sealants.

Advantages of metal over wood include the ability to provide a baked-on finish that is more resistant to the elements than coatings applied to wood, thus eliminating subsequent material and labor costs to the consumer. However, metal-based siding has less thermal insulation value and is sensitive to scratching and denting by hail and other blows to the surface. In addition, it does not have the pleasing look of a wood surface.

Vinyl siding has an economic advantage over most high quality wood and metal siding. It has better insulating qualities than metal, and it is more resistant to denting and scratching. However, vinyl is sensitive to degradation from ultraviolet rays of the sun. Previously, vinyl siding has suffered aesthetically compared to wood because of the generally higher gloss or uniform sheen of vinyl siding, which has a rather unnatural or "plastic" look. In addition, it is difficult to decorate vinyl surfaces with a natural-looking wood grain pattern that is pleasing to the consumer.

The present invention overcomes the drawbacks of presently available vinyl siding by providing a process that economically produces a vinyl-based siding panel with a superior outdoor weatherable surface having the look of either a painted wood surface or natural unpainted wood grain.

A vinyl siding presently on the market is made by a process in which an extruded sheet of PVC is decorated and embossed to produce a wood grain appearance. A silicone-coated release paper is used in this process to transfer a printed wood grain pattern to the vinyl. Typically, an acrylic clear coat and a color coat with a wood grain pattern are coated on the paper carrier sheet and then transfer-laminated onto the vinyl extrusion under heat and pressure. The wood grain color coat can simulate the appearance of painted or unpainted wood. The clear coat and wood grain color coat bond to the extrusion and release from the paper carrier sheet so that the clear coat forms a protective outer coating for the underlying wood grain color coat. During the transfer process, the release paper is pressed into contact with the extrusion by an embossing roll that transfers deep embossments to the surface of the transferred decorative wood grain. The deep embossments or indentations produce a "shadow" effect in the finished surface that more truly resembles the sheen of natural wood. Without these embossments, the vinyl wood grain-simulating surface has a flat appearance at different light angles—an unnatural look that gives the unsatisfactory appearance of a plastic simulated wood panel.

There are several drawbacks to this prior art process of making vinyl wood grain panels. A principal disadvantage is that gloss levels produced by this process are too high. Surface gloss can be measured by various techniques; and according to one technique (ASTM D 3679-86, 5.11), surface gloss levels produced by the prior art process generally have a 75° gloss reading from about 40 to about 50 gloss units. A much lower matte surface with a gloss reading below about 20 gloss units, and preferably below about 12 gloss units, is desirable to produce a more natural looking simulated wood grain furnish.

In addition to its surface gloss problem, the silicone-coated paper carrier sheet of the prior art can prevent carefully controlled printing of the decorative coatings. The carrier sheet also should release freely from the decorative layer transferred to the extruded vinyl sheet. Transfer of the decorative wood grain layer to the vinyl sheet takes place at high temperatures, since the decorative coating may be transferred to the heated vinyl extrusion immediately after it exits the extruder die opening. If the vinyl sheet is embossed when the wood grain coat is transferred, embossing temperatures should be high in order to physically form the embossments. A substantial reduction in temperatures of the vinyl extrusion prior to embossing can inhibit forming deep embossments. If the transferred wood grain coat has a highly roughened surface, in order to produce lower gloss, the surface roughness can interfere with proper release of the carrier sheet. At the high transfer and embossing temperatures, certain coatings on the carrier sheet can preferentially adhere to the carrier rather than properly releasing from it.

The decorative coatings transferred to a vinyl sheet to provide a wood grain or other surface finish also should protect the underlying vinyl panel from UV degradation, delamination, and other weather problems.

Thus, there is a need for a process for manufacturing decorative wood grain vinyl sheets with a sufficiently low gloss surface to resemble the appearance of natural wood grain, painted or unpainted. In a transfer process in which the wood grain coating is printed on a carrier and transferred from the carrier to a vinyl extrusion, while the vinyl is being deeply embossed, there is a need to ensure that the decorative wood grain coat properly releases from the carrier and bonds to the vinyl. The deep embossing step must not be adversely affected; the low matte surface of the decorative wood grain must not adversely affect proper release from the carrier; and these steps must be carried out at the high temperatures and pressures necessary for proper embossing.

These technical problems have been solved, to a great extent, by the process disclosed in the applicant's U.S. Pat. No. 5,203,941 to Spain et al., which is incorporated herein by reference. The Spain et al. patent discloses solvent cast paint films applied as a decorative coating to the matte release carrier sheet. The present invention provides a process for making the vinyl siding panels in which the disadvantages of using solvent-cast films for the outer protective coat are avoided.

One aspect of this invention provides a process for making decorative wood grain extruded vinyl sheeting suitable for outdoor use, in which the surface of the decorative wood grain has a sufficiently low gloss to resemble natural wood grain. As an option, the decorative wood grain surface can be deeply embossed to produce a natural looking wood grain surface. The low gloss wood grain coat transfers to an extruded vinyl sheet and properly bonds to the vinyl extrusion, while the carrier on which it is coated properly releases from the transferred decorative surface at elevated temperatures. The invention also provides extruded plastic siding panels with weatherable decorative surface coatings that inhibit long term UV deterioration and delamination problems.

SUMMARY OF THE INVENTION

Briefly, one embodiment of this invention comprises a process for making a protective and decorative surfacing film comprising extrusion coating a solid polymer from an extruder die directly onto a moving carrier sheet to form an extruded coating of uniform film thickness on a smooth surface of the carrier sheet. The extrusion coated layer is preferably formed as an optically clear first layer on the carrier which travels at high speed past the extruder die opening. The extrusion coated first layer is hardened by a temperature reduction, such as by contact with chill rolls, followed by applying a pigmented second layer in thin film form on the cooled first layer to form a composite paint coat in which the first and second layers are bonded to each other. An optional size or adhesive coat may be applied to the second layer. The composite paint coat is preferably transferred to a backing sheet or other substrate panel, after which the carrier sheet is separated from the resulting laminate to expose an outer surface of the first layer as a high gloss surface with a high distinctness-of-image providing a transparent protective outer coat for the pigmented second layer and the underlying substrate panel.

Although various polymeric film-forming materials can be used for forming the extrusion coated outer layer, the preferred extrudable material is a blend or alloy of a fluoropolymer and an acrylic resin in which the fluoropolymer is preferably polyvinylidene fluoride (PVDF).

The pigmented second layer, in one embodiment, can be solvent cast onto the extrusion-coated first layer, or alternatively, the first and second layers can be formed as a coextrusion which is then coated onto the moving carrier sheet.

Other forms of the invention include coextruding various layers of the composite laminate including not only the clear coat and underlying color coat but also size, tie and other functional coats as well. The carrier can also be extruded in tandem.

Since one or more layers of the composite paint coat can be extrusion coated using solid polymers, the process avoids the use of expensive solvents and also avoids VOC emissions and cross-contaminations associated with solvent casting. The process also can reduce production time and costs. A line speed for extrusion coating can be at least 50 feet per minute and in some instances in excess of 200 feet per minute, as compared to 25 feet per minute for solvent casting techniques.

Such improvements in line speed and related improvements in quality of the extrudate are produced by controlling the compatibility of the blended polymeric materials that comprise the backbone of the extruded material. By matching the melt viscosities of the blended polymeric materials in that they are reasonably close to each other, the flow characteristics of the alloyed material when heated to the extrusion temperature produce a smooth, more uniform flow which also avoids stress formation and visual defects in the hardened film.

These and other aspects of the invention will be more fully understood by referring to the following detailed description and the accompanying drawings.

BRIEF DESCRIPTION OF THE DRAWINGS

FIG. 12 is a schematic diagram illustrating an embodiment in which a coextrued substrate is formed, followed by a coextrusion coated color coat and clear coat to which a carrier sheet is applied at the extrusion coating/laminating station.

FIG. 13 is a schematic diagram illustrating an embodiment in which a sheet containing a substrate, size coat, color coat and clear coat as shown in FIG. 12 is formed and extrusion coated with a carrier sheet rather than applying it at a laminating station.

FIGS. 14 and 15 are schematic cross-sectional diagrams illustrating an in-mold process where a laminate is placed directly into an injection mold and molded into a finished panel.

DETAILED DESCRIPTION

Figure 1:
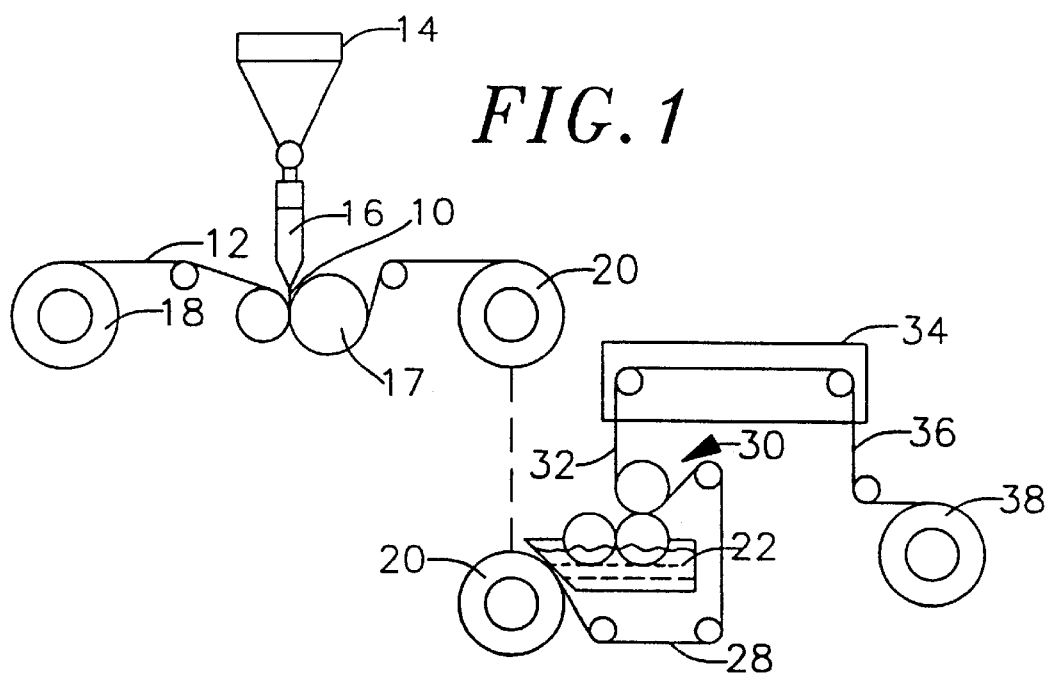
FIG. 1 is a schematic diagram generally illustrating one embodiment of the invention in which a clear coat is extrusion coated onto a carrier sheet followed by a solvent east color coat.

FIG. 1 schematically illustrates one embodiment of the invention in which a clear coat film 10 (also referred to as a clear topcoat) is extrusion coated onto a flexible carrier sheet 12. The carrier sheet is preferably a flexible, heat-resistant, inelastic, self-supporting high gloss polyester (PET) temporary casting sheet. In one embodiment, the carrier sheet can be a two mil thick biaxially oriented polyester film such as that sold under the designation Hostaphan 2000 polyester films by Hoechst Celanese Corp. The carrier sheet can be optionally release coated as described below.

The clear coat preferably comprises a solid polymeric material that can be extruded as a transparent film. The clear coat polymer is a solid polymer in the sense that it contains essentially no solvents that require high temperature exposure for drying or otherwise hardening the clear coat film. The polymeric material can comprise various thermoplastic, thermoformable and weatherable polymers such as acrylics, urethanes, vinyls, fluoropolymers, and blends thereof. Polyvinylidene fluoride (PVDF) and polyvinyl fluoride (PVF) are preferred fluoropolymers. A presently preferred extrudable polymeric material comprises a blend or alloy of PVDF and acrylic resins. The preferred acrylic resin is polymethyl methacrylate (PMMA) or copolymers thereof, although polyethyl methacrylate (PEMA) also can be used. In a presently preferred formulation the clear coat material comprises from about 50 percent to about 70 percent PVDF and from about 30 percent to about 50 percent acrylic resin, by weight of the total solids present in the PVDF/acrylic formulation. That is, these solids ranges are based on the relative proportions of the PVDF and acrylic components only in the clear coat formulation. Other minor amounts of solids such as UV stabilizers, pigments, and fillers also may be contain in the clear coat formulation.

The clear coat polymer is preformed as an extrudable material in pellet form fed from a hopper 14 to an extruder having an extruder die 16 adjacent the surface of the carrier sheet. The carrier sheet is provided as a supply roll 18, is unwound, and travels at a high line speed past the extruder die opening. In one embodiment, line speed exceeds 200 feet per minute. The die extrudes the polymeric material through a narrow sloths form a thin low viscosity coating of a liquid of uniform thickness that uniformly coats the carrier sheet which is continuously moving at high speed past the extruder die slot. Extrusion temperature is in excess of 340° F., and in some instances can approach 450° F. The entire thickness of the coating for the pass under the extruder die is applied across the width of the carrier. The extruded coating is immediately cooled thereafter, by contact with a chill roll 17, which hardens the extruded clear coat layer.

The cooling step using the chill roll is described in more detail below. The extrusion coated carrier is wound as a take-up roll 20.

A pigmented color coat material 22 is solvent cast on the extruded clear coat side of the carrier 12. The color coat 22 can comprise various polymers used as binders for paint films such as thermoplastic, thermoformable and weatherable acrylics, urethanes, vinyls, fluoropolymers and blends thereof. The fluoropolymers preferably comprise PVDF or copolymers of PVDF resins. The preferred color coat formulation is a blend of copolymers of PVDF and an acrylic resin. Preferably, the acrylic component can comprise PMMA, although PEMA also can be used. In addition, reflective flakes can be uniformly dispersed in the color coat to produce automotive films having a metallic appearance. Formulations for solvent casting the color coat formulation are described for example in International Application WO 88/07416 to Spain et al. which is incorporated herein by this reference. Following solvent casting of the color coat on the clear coat, the color coat is dried at elevated temperatures to evaporate the solvents, and the paint coated carrier is then wound as a take-up roll 38. An optional size or adhesive coat may be applied to the color coat side of the carrier sheet.

In another embodiment of the invention, the clear topcoat 10 can be extrusion coated in thin film form generally ranging from about 0.1 mil to 3.0 mils in thickness onto the surface of the carrier 12. Thicker top coats may be used for certain multi-layer mils containing a base coat with reflective flakes. The carrier is preferably an oriented polyester casting film such as DuPont Mylar A or Hoechst Hostaphan 2000. The thickness of carrier sheet can be from 0.48 mil to 3.0 mils thick, but preferably 1.42 to 2.0 mils functions best for subsequent coating and lamination operations, that is, for web control and heat transfer properties.

In this embodiment, the carrier film is unwound, then passed to the extrusion coating die 16 where the clear topcoat 10 is extrusion coated onto the carrier sheet. The topcoat formulation is preferably an extrudable solid polymeric material comprising a fluorocarbonfacrylic blend such as polyvinylidene fluoride, i.e., Kynar 720 (Elf Atochem), s and polymethyl methacrylate, i.e., Plexiglas VS100 (Atohaas). The fluorocarbon polymer content m these blends can range from about 50% to about 70% and the acrylic component can range from about 30% to about 50%. Other fluorocarbons, other acrylics, and copolymers thereof may also be used as topcoats. The preferred topcoat thickness ranges from about 0.5 to 2.0 mils in order to obtain the needed gloss, DOI, and abrasion, weathering, and impact resistacce in the finished product. The resulting clear coat film is not a free film or a self-supporting film and requires use of the carrier sheet 12 for support throughout the process.

Figure 2:
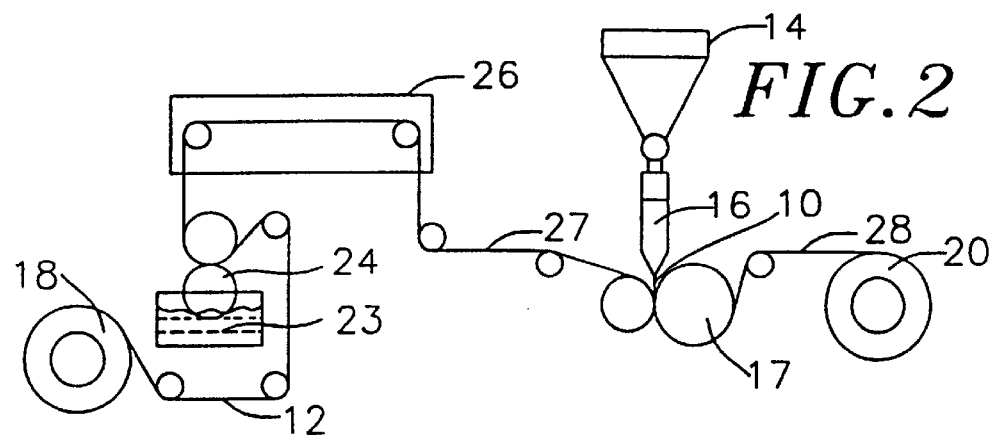
FIG. 2 is a schematic diagram illustrating a process of applying a release coat or gloss control coat to a carrier sheet and then extrusion coating a clear coat on the released carrier sheet.
Figure 3:
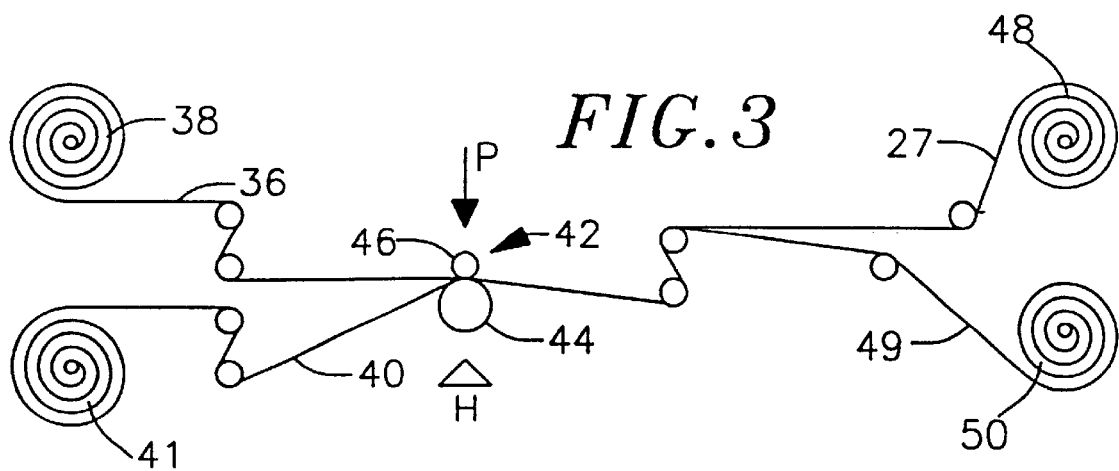
FIG. 3 is a schematic diagram illustrating a further step in the process in which the clear coat/color coat film is transfer-laminated to a thin semi-rigid backing sheet.
Figure 4:
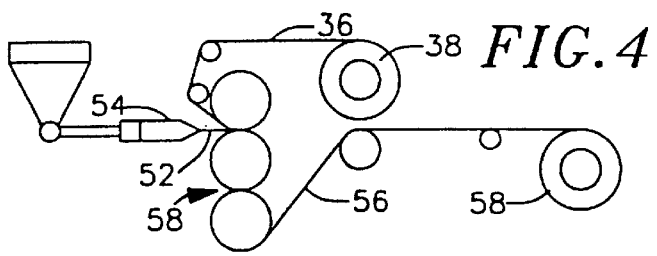
FIG. 4 is a schematic diagram illustrating an alternative subsequent step in the process in which a paint film is applied to a backing sheet while the sheet is being formed by the sheet extruder.
Figure 5:
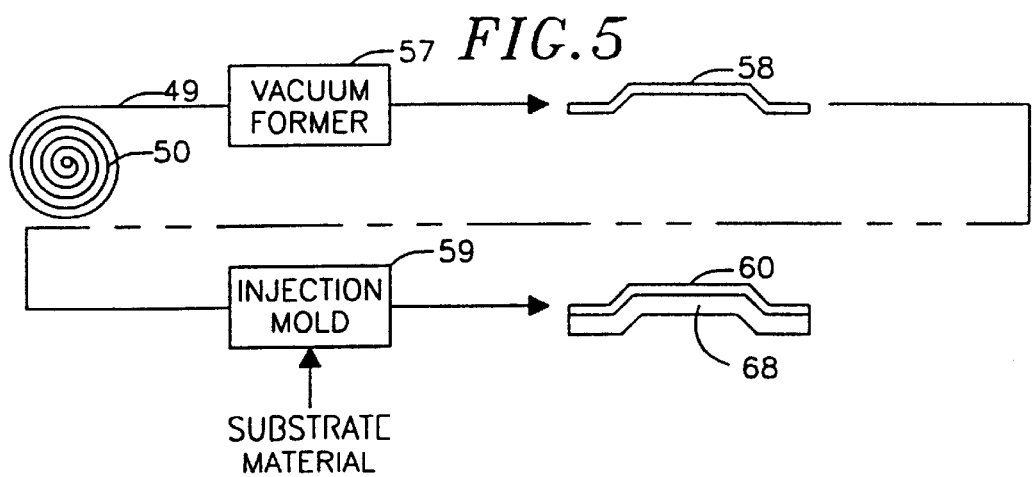
FIG. 5 is a schematic diagram illustrating final steps of the process in which the laminate produced by the steps shown in FIG. 3 or 4 is vacuum-formed and then injection molded to produce a finished panel.

FIG. 2 is a schematic diagram illustrating inmore detail the successive steps in an extrusion coating process illustrated generally in FIG. 1. FIGS. 3 through 5 are schematic diagrams illustrating successive steps in the extrusion coating process as applied for producing an exterior automotive quality paint coat on a molded plastic car body panel. The extrusion coated clear coat/color coat film is bonded to a contoured surface of a molded plastic car body panel to form a high gloss/high DOI protective and decorative outer surface on the finished body panel. FIGS. 2 through 5 are to be understood as one embodiment of a use of the extrusion coated films of this invention, inasmuch as other applications are also within the scope of the invention as it applies to protective and decorative surfacing films for substrate panels.

Referring to FIG. 2, the carrier 12 is first coated with an optional release coat which provides a means of controlling the gloss and DOI levels of the extruded clear coat. The supply roll 18 of the carrier film 12 is shown with the carrier sheet passing around a series of rolls prior to applying a release coat material 23 to the surface of the carrier by a conventional gravure cylinder 24. The release coat is preferably a silicone-based liquid coating applied to the carrier by a conventional coating process such as gravure printing or by direct or reverse roll coating. The release coated carrier then passes through an oven 26 for drying the release coat. The drying oven preferably comprises an impinging air oven sufficient for drying and crosslinking the release coat material. Application of the release coat is preferably controlled so that it produces a high gloss surface in its dry film form.

The release coated carrier sheet 27 then exits the drying oven 26 and passes to the extrusion coating operation where the extruder die 16 extrusion coats the clear coat film 10 onto the release-coated surface of the carrier sheet. Immediately following the extrusion coating step the clear-coated film passes around the chill roll 17 where the film undergoes controlled cooling. One or more water cooled chill rolls can be used for contacting the carrier sheet to produce controlled temperature reduction. The process by which the carrier is cooled also controls the exterior gloss and DOI of the finished product. The extrusion topcoated and release coated carrier film 28 is then wound as the take-up roll 20.

Referring again to FIG. 1, the clear coat side of the carrier 28 is coated with a solvent cast color coat. The solvent cast color coat material 22 is applied by a reverse roll coating station 30, although the color coat film also can be applied by gravure printing or other solvent casting or coating techniques. The paint coated film 32 comprising the extruded clear coat and solvent cast color coat then passes to a drying oven 34. The color coat is preferably dried at oven temperatures from about 250° F. to 400° F. Preferably, drying is done in multiple stages as is known in the art. The solvent gases are driven off by the drying process, leaving a film 36 that exits the oven comprising a color coat in hardened form bonded to the extrusion coated clear coat on the release coated carrier sheet. The film 36 is then wound as the take-up roll 38.

The color coat side of the paint coat on the carrier may next be coated with a size coat such as a thermoplastic adhesive. A chlorinated polyolefin (CPO) adhesive is used as the tie coat for bonding to a substrate made of thermoplastic polyolefin. A CPO size coat formulation preferably includes Hypalon 827B (DuPont) mixed with a solvent such as toluene in a ratio of about 25%/75%, by weight.

Referring to FIG. 3, the paint coated carrier 36 is next laminated to a thermoformable polymeric backing sheet by dry paint transfer-laminating techniques. The laminating step includes separating the carrier sheet from the clear coat layer and simultaneously bonding the clear coat and color coat to a semi-rigid backing sheet 40. The backing sheet 40 is initially wound as a supply roll 41 and is unwound and fed to a transfer-laminating station 42. The thickness of the backing sheet is preferably in a range from about 10 to about 40 mils with 20 mils being a preferred thickness of the backing sheet. The backing sheet can be made from various polymeric materials such as thermoplastic polyolefin, polyester, ABS, nylon, PVC, polycarbonate, polyarylate, or polyolefin such as polypropylene or polyethylene. The paint coated carrier and backing sheet pass between a heated laminating drum 44 and a pressure roll 46 for pressing the overlapping sheets into contact and for heating them at a temperature sufficient to activate the adhesive size coat, which may be coated on the dried color coat. Alternatively, the size coat may be coextruded with a backing sheet or laminated to the backing sheet prior to lamination of the clear coat and color coat to the backing sheet. The process of FIG. 4 transfers the paint coat (clear coat/color coat) to the surface of the semi-rigid thermoformable backing sheet.

Following the transfer-laminating step, the carrier sheet 27 is separated from the resulting laminate and wound as an unwind roll 48, and the resulting laminate 49 (which comprises the thermoformable backing sheet with the adhered color coat and clear coat) is wound as a take-up roll 50. The exposed clear coat side of the resulting laminate 49 is measured for DOI and gloss. The smooth surface of the release coated carrier sheet 27 transfers to the clear coat side of the sheet and is replicated on the smooth surface of the laminate, which results in a high gloss and a high DOI appearance. A high DOI greater than 60 and a high 20° gloss greater than 75 are achieved with this invention.

FIG. 4 illustrates an alternative process of transferring the clear coat/color coat paint film to a thermoformable backing sheet. In this embodiment the backing sheet 52 is continuously extruded from an extruder die 54 while the paint film 36 supported by the carrier is unwound from the roll 38 and continuously extrusion laminated to the backing sheet as it is being formed by the sheet extruder. The backing sheet may be made from any extrudable polymeric material selected from the group of backing sheet materials discussed previously. The resulting laminate (comprising the carrier-supported clear coat/color coat films laminated to the extruded sheet 52) passes to a calendar/chill roll stack 58 for hardening the backing sheet and bonding the clear coat/color coat film to it. The finished paint film laminate 56 is wound as a take-up roll 58 after the release coated carrier sheet 27 is removed.

Referring to FIG. 5, the paint coated backing sheet 49 (from the FIG. 3 process) or 56 (from the FIG. 4 process) then passes to a thermoforming step where the sheet is thermoformed into a desired contoured three-dimensional shape. The thermoforming operation generally includes placing the paint coated backing sheet in a vacuum forming machine 57, and heating it to a temperature in the range of about 270° F. to 540° F. The paint-coated side of the backing sheet is exposed during the thermoforming operation. After the laminate is heated to the desired temperature, the laminate is vacuum formed into the desired three-dimensional shape by drawing a vacuuum on a vacuum forming buck to force the molten plastic into the shape of the working surface of the buck. Pressure also may be used to force the sheet around the tool. The buck stays in place long enough to cool the plastic to a solid state, after which the laminate is removed from its surface to form the resulting three-dimensionally contoured shape of the paint coated laminate 58. In one embodiment, the paint coat can elongate from about 40 percent to about 150 percent greater than its unextended state during the thermoforming step without deglossing, cracking, stress whitening, or otherwise disrupting the exterior automotive durability properties and the appearance properties of gloss and distinctness-of-image that were present in the composite paint coat before thermoforming. In one embodiment DOI retained by the thermoformed sheet is in excess of 60 (as measured on the HunterLab Dorigon D-74R-6 instrument). 20° gloss measures at least 60 and 60° gloss measures at least 75 under such elongation. In some instances involving thermoforming with little or no shaping (and therefore little or no elongation), finished products are made with high levels of retained gloss and DOI.

Following the thermoforming step and die cutting step, the resulting paint coated thermoformed shell 58 is then placed in an injection mold 59 having a contoured mold face that matches the contoured outer surface of the clear coat side of the thermoformed shell 58. A polymeric injection molding material is injected into the mold and forced against the backing sheet side of the thermoformed sheet to bond the substrate material to the thermoform. The resulting panel 60 is then removed from the mold to provide a rigid substrate panel with a contoured decorative outer surface comprising the thermoformed backing sheet and its adhered clear coat, color coat, size coat and tie coat, if required. The preferred polymers used for the substrate plastic molding material of the finished panel are polymers compatible with the material from which the backing sheet is made. These may include thermoplastic olefins, ABS, nylon, polyester, polycarbonates, and polyvinylchlonde compatible with the corresponding materials from which the backing sheet is made.

The transfer-lamination, thermoforming, and injection molding steps can be carried out by various processing steps known to those skilled in the art and are described, for example, in International Application WO 88/07416 to Spain et al. and U.S. Pat. No. 4,902,557 to Rohrbacher which are incorporated herein by reference.

In one embodiment of the invention, FIG. 2 schematically illustrates a two-step process which can be performed in tandem or as two individual operations: (1) gravure printing a polyester carrier film with a silicone release coat or a gloss control release coat, and (2) extrusion coating a clear topcoat on a silicone release coated or gloss control coated carrier from the first operation. As mentioned previously, the release coat surface of the carrier is optional. The carrier film 12 is unwound from the supply roll 18 and this film travels into the gravure print station where the release coat or gloss control release coat is gravure coated onto carrier film. The carrier film coated with the silicone release coat or gloss control release coat is passed through a 20-ft. drying oven 26 with impinging air for 325–350° F. sufficient for drying and crosslinking the silicone release coat or the gloss control release coat on the carrier film. In the first stage of the drying oven, the silicone release coat or the gloss control release coat is sufficiently crosslinked to permanently bond it to the carrier sheet. The silicone release coat dried deposition weight is from 0.5–1.0 gm/m$^2$ and the gloss control release coat dried deposition weight is from 3–5 gm/m$^2$. (As an alternative, the silicone coated PET can be purchased directly from the manufacturer, such as American Hoechst 1545.) The coated carrier film 27 which has dried and crosslinked exits the oven 26, and passes to the extrusion die 16 where the extruded clear topcoat 10 is applied to the release coated carrier.

FIG. 1 schematically illustrates roll coating of a solvent cast PVDF/acrylic color coat material 22 onto the clear extruded topcoat on the PET carrier. The extruded clear coated film 28 travels to the roll coating station 30 where a polyvinylidene fluoride/acrylic pigmented color coat is roll coated onto the extrusion topcoated carrier. One preferred ratio of polyvinylidee fluoride copolymer to acrylic polymer is 75/25 by weight basedon the total PVDF copolymer/acrylic polymer solids contained in the color coat. Kynar 7201 (Elf Atochem) and Elvacite 2008 (I.C.I.) are preferably used in this application. The sheet 32 coated with the color coat passes into the drying oven which has three drying zones set at 160°, 240° and 360° F. The color coat is dried and fsed before leaving the drying oven.

Figure 6:
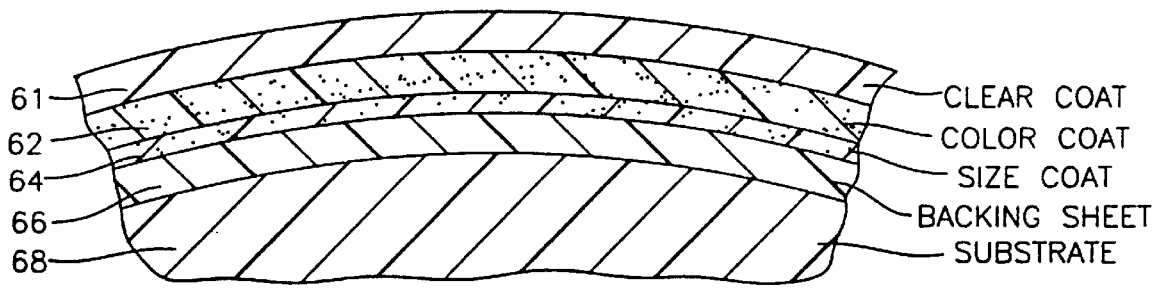
FIG. 6 is a schematic cross-sectional view illustrating multiple layers of the finished paint coated panel of FIG; 5.

FIG. 6 illustrates a cross-sectional view of the finished body panel which includes a contoured outer surface formed by a clear coat 61 that has been extrusion coated and bonded to an underlying color coat 62, a size coat 64 which bonds the color coat side of the clear coat/color coat composite to a thermoformable backing sheet 66, and an underlying rigid substrate panel 68. The contoured decorative outer surface of the clear coat/color coat paint film provides a high gloss, high DOI outer surface in which the color coat is visible through the transpant outer clear coat.

Many of the constructions described above with backing sheets less than 20 mils can be placed directly into an injection mold without the intervening thermoforming step. The plastic molding material is then injected into the mold and shapes the laminate to the contoured surface of the mold cavity, while the plastic molding material forms the substrate panel of the finished decorated part. Many clear coat, color coat, and size coat foils may be made by this in-mold process to form the finshed part, or this construction may be first laminated to a 3–15 mil flexible backing sheet, such as vinyl, nylon, or urethane, the carrier removed, and the laminate then formed in the injection molding machine to produce a finished part. These in-mold techniques have been used previously in the industry for interior automotive films.

Figure 7:
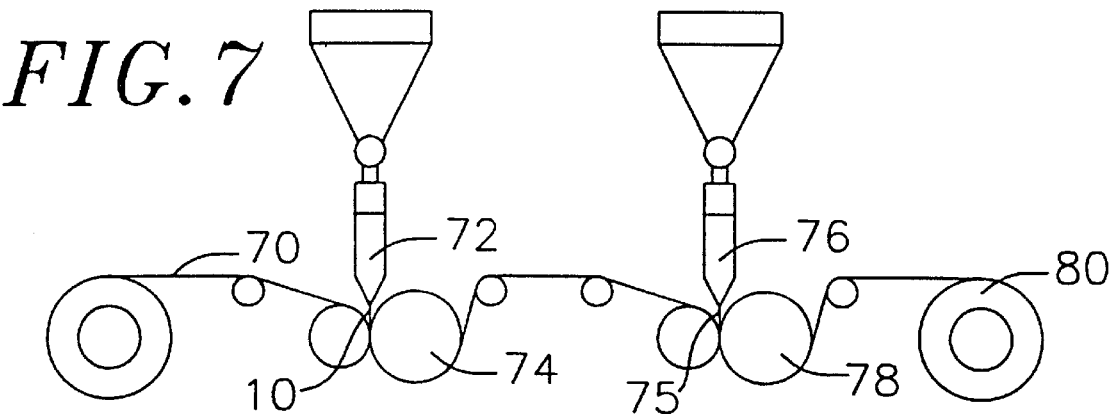
FIG. 7 is a schematic diagram illustrating an embodiment of the invention in which a clear coat and a color coat are formed as extrusion coatings applied to a carrier sheet.

FIG. 7 illustrates an alternate form of the invention in which the clear coat and color coat are extruded in series onto a common carrier sheet. In this embodiment the clear coat material 10 is first extruded onto an optionally release coated carrier sheet 70 in a manner similar to the process described in FIGS. 1 and 2. The clear coat material is extruded through a first extrusion die 72 for extrusion coating the clear coat on the optionally release-coated surface of the carrier. The clear-coated carrier sheet immediately passes around a first chill roll 74 where the clear coat is hardened. The carrier then continuously transports the hardened clear coat past a second extrusion die 76 where the color coat material 75 is extrusion coated directly onto the clear coat. The color coat then immediately undergoes controlled cooling by passing around a second chill roll 78. The carrier sheet with the clear coat/color coat paint film is then wound as a take-up roll 80.

Figure 8:
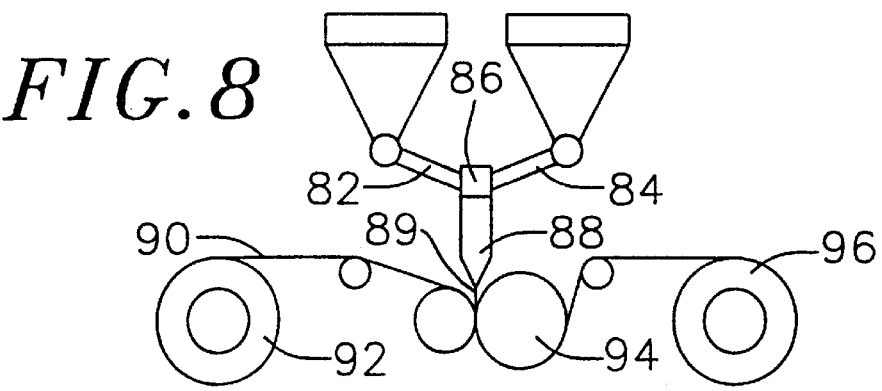
FIG. 8 is a schematic diagram illustrating an embodiment of the invention in which a clear coat and color coat are produced as a coextrusion coating on a carrier sheet.

FIG. 8 illustrates one embodiment of an extrusion coating process in which multilayer films are formed as coextrusions coated onto the optionally releaseoated carrier sheet. In this process the optional clear coat and color coat are extrusion coated from a single extrusion coating station comprising two separate extruders. A first extruder 82 contains the clear topcoat material. A second extruder 84 extrudes the pigmented color coat material. The melt steam from these two extruders is fed to a feed block 86 which determines the relative thickness of each component in the final coextruded film. In one embodiment the clear coat material comprises an alloy of PVDF/acrylic resin containing from about 50 to 70% PVDF and from about 30 to 50% acrylic resin as described above. The color coat material is a PVDF copolymer/acrylic resin blend as described above. A clear coat having a thickness of one to two times the thickness of the color coat is a preferred embodiment. The partition melt flows from the feed block 86 to the extruder die 88. The melt 89 is then extruded onto the polyester carrier 90 which is unwound from supply roll 92 and travels past the extruder die slot. This coated foil then travels immediately over a chill roll 94 and then to a take-up roll 96. This foil with an appropriate size or tie coat system can be laminated as described in FIG. 3 to produce a laminate which can be thermoformed, die cut, and injection clad to yield a finished automotive part.

In a further embodiment (not shown), size coat, color coat, and clear coat materials are extruded through three separate extruders. One extruder is fed a size coat, a second extruder is fed a color coat, and a third extruder is fed a clear coat. The melt from each extruder is then fed into a common feed block and the resulting partitioned melt is then extruded from an extruder die onto a polyester carrier traveling past the extruder.

Figure 9:
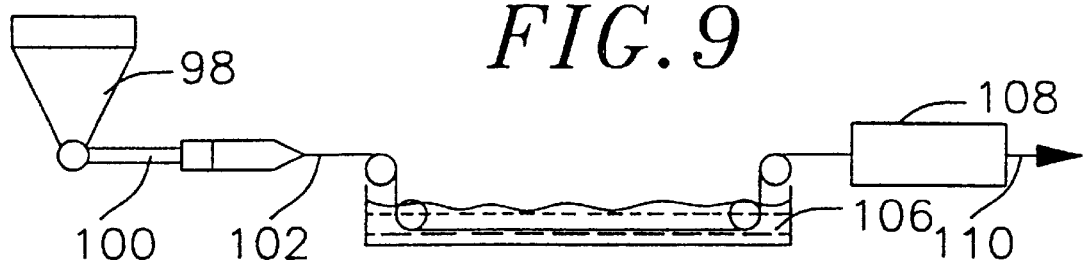
FIG. 9 is a schematic diagram illustrating an embodiment of the invention in which resins and additives are compounded by melt blending in an extruder to produce homogeneous pellets for use in the extrusion coating process.

Referring briefly to FIG. 9, the clear coat, color coat and size coat materials referred to in the embodiments of FIGS. 7 and 8 can be initially made in pelleted form. A dried blended formulation is fed to an extrusion hopper 98 and is then extruded through a twin screw compounding extruder 100 to form multiple extruded strands 102 which pass to a cooling bath 106. This hardens the extrusion which then passes to a chopper 108 that produces the finished pellets at 110. The extruded size coat, clear coat and color coat materials described previously can be in pelletized form produced by the process of FIG. 9.

Figure 10:
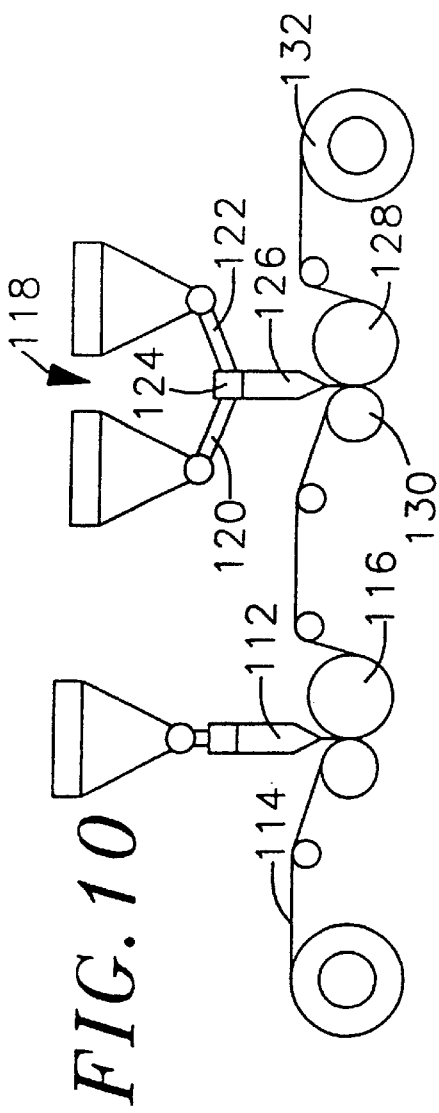
FIG. 10 is a schematic diagram illustrating an embodiment in which a clear coat is extrusion coated onto a carrier sheet followed by a separate coextrusion coating of a color coat and size coat applied to the same clear coated carrier sheet.

FIG. 10 schematically illustrates a process in which two extrusion coatings are performed in series to produce a multilayer clear coat/base coat/size coat on a polyester carrier. In this process a clear coat material is extruded through a first extrusion die 112 onto a release-coated carrier 114. After passing around a chill roll 116 the topcoated carrier passes to a second extrusion station 118 having a pair of extruders 120 and 122. The color coat material and size coat material in pelletized form is fed to individual extruders and the output is introduced to feed block 124 and then through an extruder die 126 onto the clear-coated carrier. The feed block introduces an 85/15 ratio of color coat to size coat thickness. The color coat side of the coextrusion is coated onto the clear coat with the size coat on the outside. The clear coat and extruded color coat/size coat are laminated at the nip of a chill roll 128 and a pressure roll 130. The laminate then passes around the chill roll and to a take-up roll 132. This foil can be laminated to unprimed backing sheet materials (such as those materials described previously) instead of primed ABS as in FIG. 4 to produce a laminate which can be thermoformed, die cut, and injection clad to produce a finished exterior automotive part with a high gloss and a high DOI.

Figure 11:
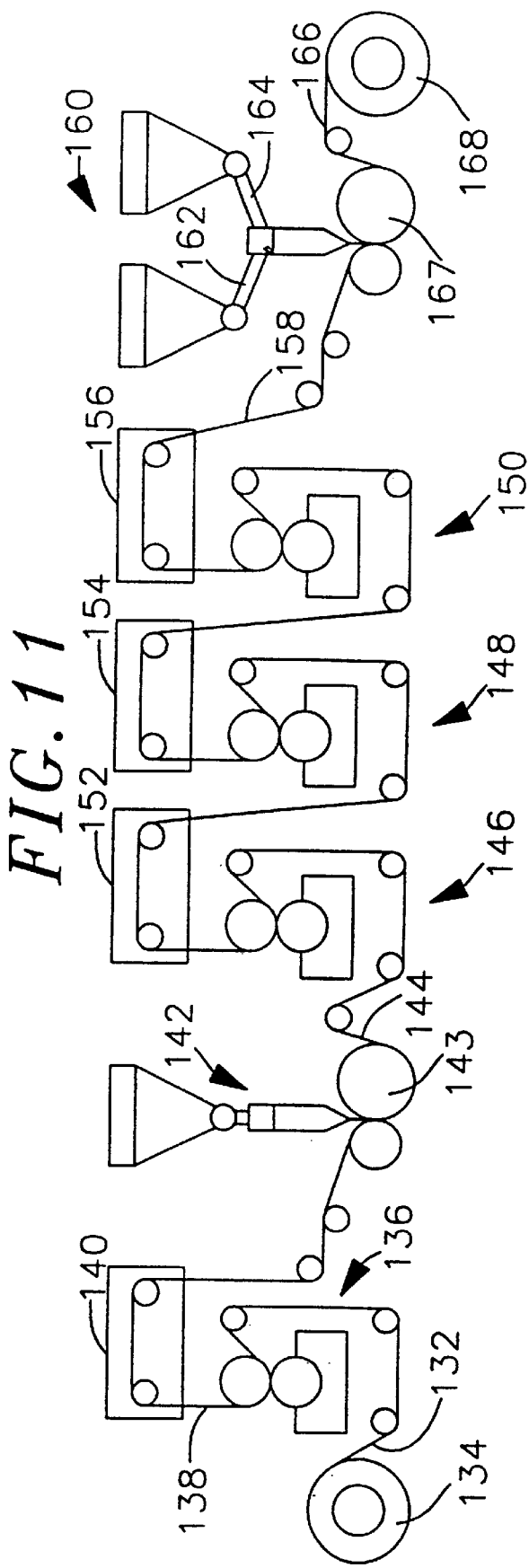
FIG. 11 is a schematic diagram illustrating an embodiment in which a release gloss control coating is applied to a carrier sheet by a solvent process followed by an extrusion-coated clear coat which is then printed with solvent-based gravure patterns and then coextrusion coated with a color coat and a size coat.

FIG. 11 schematically illustrates a process in which an exterior foil is produced using extrusion coating and gravure printing. A polyester carrier sheet 132 is unwound from a supply roll 134. The polyester web travels over idler rolls to a gravure print station 136 where either a release coat or a gloss control coat is applied; the coated web 138 is then dried in a gravure oven 140. The dried release coated or gloss control coated web travels over idler rolls to an extrusion coating station 142 where a clear topcoat is extrusion coated onto the web and hardened by contact with a chill roll 143. These processes have been described in FIG. 2. The topcoated web 144 travels over idler rolls to a series of gravure print stations 146, 148 and 150 and gravure ovens 152, 154 and 156 in tandem where a printed pattern (such as wood grain, brushing, or geometric) is applied to the topcoated web as described in FIG. 2. The printed web 158 travels over idler rolls to an extrusion coating station 160 having two extruders 162 and 164 where a color and size coat are coextruded onto the printed web as described in FIG. 10. The finished decorative exterior foil 166 is extrusion-laminated and travels over a chill roll 167 and idler rolls to a take-up roll 168. This foil can be laminated to a backing sheet, thermoformed, die cut, and injection clad to produce a finished exterior automotive part such as brushed aluminum body side molding.

FIG. 12 schematically illustrates a process in which an exterior automotive laminate is produced in-line using thick sheet extrusion and extrusion coating processes. A thick sheet coextrusion line has two extruders. A first extruder 170 is fed with an extrudable material of dried pellets or dried flowable powders comprising ABS, polyolefins, polycarbonate or other extrudable thermoplastic materials suitable as a flexible laminate backing sheet. A second extruder 172 is fed with an extrudable material of dried pellets or dried flowable powders such as acrylics, CPO, urethanes and other material for use as a size coat for exterior laminate foils. A melt stream from the two extruders is fed to a feed block 174 which controls the relative thickness of each component layer in the final coextruded sheet. The partitioned melt 175 is then extruded through a die 176 to a calendar stack consisting of three temperature controlled rolls 178, 180 and 182. The coextruded sheet 175 is fed horizontally into a set opening between the top roll 178 and middle roll 180 of the three roll calendar stack. The top roll is used to meter and the middle roll is set at line speed to support the substrate while it starts to solidify. The bottom roll 182 is used to smooth the exposed surface of the size coat and to finish cooling the substrate for proper handling. The cooled primed sheet 184 passes over idler rolls to an extrusion coating station having two extruders where a color coat and a clear topcoat are coextruded onto the primed sheet. The color coat material is fed from a hopper 186 to a first extruder 187 and the clear coat material is fed from a hopper 188 to a second extruder 189. The first extruder 187 uses compounded pigmented PVDF copolymer/acrylic color coat as its feedstock. The second extruder 189 uses PVDF/acrylic clear topcoat as its feedstock. The melt stream from two extruders is fed to a feed block 190 which determines the relative thickness of each component in the final coextruded film. The partitioned melt flows from the feed block to an extrusion die 192. The partitioned melt is fed into the extrusion coater nip comprising a high durometer backup roll 194 and a chill roll 196. The primed backing sheet enters the extrusion coating nip and a high gloss polyester carrier film 198 is fed over the chill roll 196 from a supply roll 200. This polyester film is used to enhance the gloss of the final product, since the topcoat of the coextruded film replicates the smooth high gloss surface of the polyester web. The composite structure (backing sheet, size coat/color coat/clear coat/carrier film) passes through the nip and is wrapped around the chill roll. The laminate 202 then travels over idler rolls to a take-up roll 204.

FIG. 13 schematically illustrates an embodiment similar to FIG. 12 in which an exterior laminate with a thermoformable protective sheet is produced in-line using a flat sheet extrusion line and two extrusion coating stations. A flat sheet extrusion line as described in FIG. 12 coextrudes a primed backing sheet 206. This primed backing sheet passes over idler rolls into a nip of extrusion coating station 208 where a color coat and a clear topcoat are coextruded onto the primed surface of the backing sheet. The clear coat/color coat are passed around a chill roll to produce an exterior laminate 210. The resulting laminate passes over idler rolls into the nip of a second extrusion coating station 212 where a thermoformable protective coat is extruded onto the topcoated surface of the laminate. A thermoformable material such as ethylene-acrylic acid or polypropylene can be extrusion coated as the protective coat. The exterior laminate with a thermoformable protective coat can be thermoformed, die cut, and injection clad to produce a finished part with a temporary protective coat which protects these parts in shipping, assembly and painting. The protective coat is stripped off after these operations to yield a finished part. The protective coat also can be used as a paint mask.

Referring briefly to FIGS. 14 and 15, an in-mold process is schematically illustrated in which a finished exterior automotive part can be produced using exterior in-mold foils or in-mold laminates as produced by conventional solvent casting and by extrusion coating processes or a combination thereof. For shallow draw parts (0.125"–0.25") with gentle draw and radius corners, an in-mold foil can be used to form an exterior decorated automotive part. This in-mold foil 214 as illustrated in FIG. 14 is placed in a mold cavity 216 of an injection molding machine with a PET carrier film 218 facing the cavity side of the mold. The mold is closed, sandwiching the foil between sides of the molding cavity. Molten plastic 220 is injected into the mold cavity against the size coated face 222 of the foil, forcing the in-mold foil to conform to the shape of the cavity. The size coat bonds the foil to the injection molding plastic which forms a substrate panel 223. The molded part 224 is shown in FIG. 15. The mold is then opened and the carrier sheet and any fringe resulting from the in-mold process are removed to yield a decorated exterior body part 226.

For deeper draw in-mold parts, an in-mold laminate is used in the process illustrated in FIGS. 14 and 15 to produce a decorative exterior body part. Such an in-mold laminate can be produced by first laminating an in-mold foil to a flexible backing sheet, such as a flexible vinyl, urethane or nylon sheet described previously. This in mold laminate is placed in the mold cavity of an injection molding machine so that the topcoat of the in-mold laumnate faces the cavity side of the mold. After the mold is closed, preheating the laminate, or blowing or vacuum forming the laminate into the mold cavity prior to injection cladding can improve the appearance of the finished part. The laminate conforms to the shape of the mold and less wrinkles and bum through occur during the injection process. Molten plastic is injected against the backing sheet, forcing the infold laminate to conform to the shape of the mold cavity. The backing sheet bonds the laminate to the injection molding plastic. The mold is opened and the fringe of the laminate sheet is cut away to yield a finished exterior part (not shown).

As a further alternative, the transfer-lamination, thermoforming and injection molding steps of the insert-mold process described in the applicant's International Application WO 8/07416 to Spain et al. Can be carried out to produce a finished automotive body panel or part.

Figure 16:
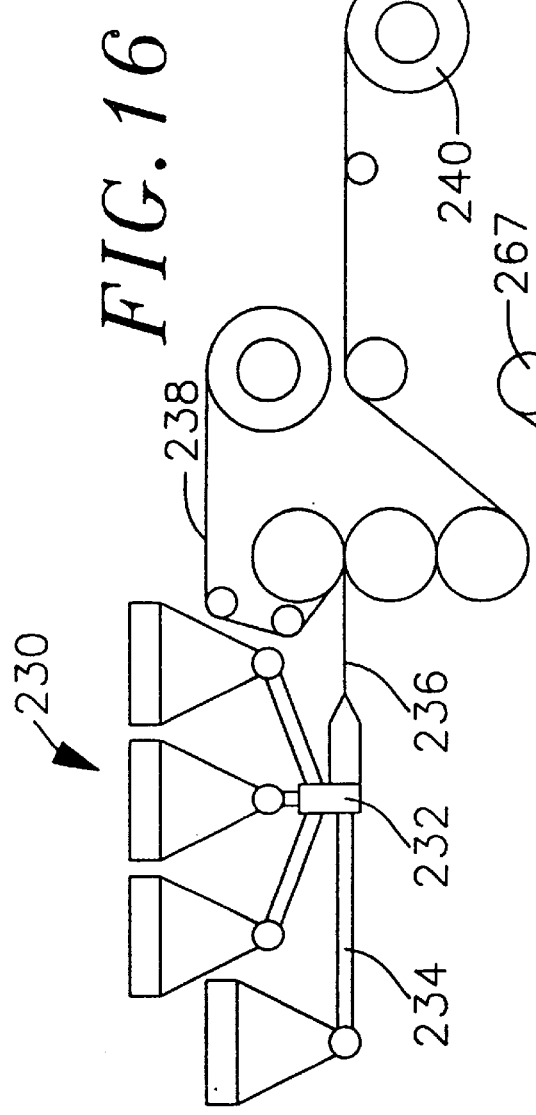
FIG. 16 is a schematic diagram illustrating an embodiment in which a substrate is coextruded in sheet form, followed by extrusion coating a size coat, a color coat and a clear coat, followed by introduction of a carrier sheet.

FIG. 16 shows a further embodiment of the invention comprising a three-layer coextrusion which includes a clear coat, a color coat and a size coat extruded at 230. The clear coat, color coat and size coat, in that order, are joined together in a die block 232 with a backing sheet from an extruder 234. The backing sheet provides a support for the three layer coextruded films. The polymeric material, that comprises the support layer of the coextrusion can be any extrudable material such as ABS, thermoplastic polyolefin, polypropylene or PETG. The resulting four-layer coextrusion 236 is then extrusion coated onto the surface of a PET carrier sheet 238 that travels past the extruder die opening. The carrier 238 can comprise various polymeric materials such as PET or PETG. In one process, a clear coat, color coat, and size coat are extrusion coated from a single extrusion coating station using three separate extruders as illustrated in FIG. 16. One extruder contains a PVDF/acrylic clear topcoat as described previously. The second extruder is fed pigmented PVDF copolymer/acrylic color coat as described previously. The third extruder is fed an acrylic size coat material such as Plexiglas VS100 (Atohaas). The melt streams from these three extruders are fed to the feed block 232 which controls the relative thickness of each component in the final coextruded film. A 45/45/10 ratio of clear coat/color coat/size coat is preferred. The partitioned melt 236 flows from the block to the extruder die. The partitioned melt is then extruded onto the polyester carrier sheet. The carrier sheet can be extruded simultaneously with coating of the extruded films onto the carrier, as in FIG. 16, or the three-layer extruded film can be coated onto a carrier sheet being unwound from a supply roll. This coated foil then travels over a chill roll and idler rolls to a take-up roll 240. Alternatively, this foil can be laminated to unprimed ABS instead of primed ABS to yield a laminate which can be thermoformed, die cut, and injection clad to yield a finished automotive part.

Another embodiment of this invention is an extruded color coat that can be used without a clear coat. The extruded color coat which comprises the exterior weatherable layer of the finished product can be made from various thermoplastic and thermoformable polymers such as acrylics, urethanes, vinyls, fluoropolymers, and blends thereof. A presently preferred extrudable polymeric color coat material comprises a blend of polyvinylidene fluoride (PVDF) and acrylic resins. The preferred acrylic resin is a polymethyl methacrylate polymer (PMMA), although a polyethyl methacrylate polymer (PEMA) also can be used. In a preferred formulation the polyvinylidene difluoride Kynar 720 (Elf Atochem) comprises 55 percent of the formulation. VS-100 acrylic polymer (Atohaas) comprises 23 percent, Tinuvin 234 UV Absorber (Ciba-Geigy) comprises 2 percent, and titanium dioxide and mixed metal oxide pigments comprise 20 percent.

A concentrate of UV absorber and acrylic resin can be compounded and added to the PVDF/acrylic pellets at the extruder when-extrusion coating. Such concentrates also can include pigments and other additives combined with the pellets in the extruder. For instance, the mixed metal pigments and titanium dioxide pigment are typically predispersed in the acrylic resin (VS-100) in pellet form. The individual pigment pellets can be combined with the Kynar 720 resin, VS-100 acrylic resin and Tinuvin 234, dry blended, and then compounded in a twin screw extruder. Press outs of the colored pellets can be used to check color.

EXAMPLE 1

The following formulation of an extrudable clear coat polymeric material was pelletized, and the pellets were fed to an extruder for extrusion coating the resulting clear coat onto the surface of a carrier sheet traveling past the extruder die slot.

| INGREDIENTS | PARTS* |
|---|---|
| 1 Kynar 720<br>Polyvinylidene fluoride (PVDF)<br>Atochem North America, Inc. | 65.0 |
| 2 Elvacite 2042<br>Polyethyl methacrylate (PEMA)<br>E.I. DuPont (sold to ICI) | 35.0 |
| 3 Tinuvin 234<br>UV stabilizer<br>Hydroxyphenylbenzotriazole<br>Ciba-Geigy | 2.0 |

*In this and other examples, "Parts" identified for each component are on a parts per weight basis.

Kynar 720 is the extrusion grade PVDF corresponding to Kynar 301F that is commonly used in a solvent cast PVDF/acrylic formulation. The Kynar 720 has a melting temperature of about 167° C., a Tg of about −38–41° C., and a melt viscosity at 215° C. (measured in Pas·sec sv) at 100,500 and 1,000 l/sec) of 1,153, 470 and 312, respectively. The Elvacite 2042 is a polyethyl methacrylate (PEMA), which is compatible with PVDF and is the same acrylic used in the standard solvent cast Avloy® clear coat; this formulation was selected to simulate the formulation of the standard Avloy® clear coat. (Avloy is a trademark of Avery Dennison Corporation, the assignee of this application.)

This formulation was compounded twice through a 3.25" Davis Stadad single screw extruder to obtain uniform blended pellets; however a twin screw is used for pelletizi in later examples for better distributive mixing. The two resins were dried in a dryer at 130° F. for four hours before being extruded into pellets, and during the extrusion process a vacuum vent in the compression zone of the screw was used to further remove moisture and other volatile components. The feed into the extruder was starved, and the heating elements or zones of the extruder were set at (1) 420° F., (2) 430° F., (3) 430° F., (4) 430° F., (5) 430° F., (6) 430° F. adapter, (7) 430° F. die, but the observed values were (1) 416° F, (2) 418° F., (3) 427° F., (4) 423° F., (5) 428° F., (6) 424° F. adapter, (7) 429° F. die. The screw was maintained at 70 rpm using 34 amps and a screen pack consisting of two 20-mesh screens in series was used to clean up the melt stream. This material was pelletized with a 9–10 ft. water bath for a nine-second immersion to cool the exudate prior to pelletization. Press outs were used to judge the homogeneity of the pellets.

This material was extrusion coated onto a two mil high gloss polyester film from American Hoechst designated Grade 2000. (The extruded material had a melt viscosity (Pas·sec) at 100, 500 and 1,000 l/sec of about 752–769, 303–308, and 200, respectively.) The polyester carrier provides a smooth glossy surface upon which the hot exudate can form a thin clear film ranging from about 0.1 mil to about 2–3 mils thick. The thickness of the resulting films can be adjusted by the extrusion coating line speed and the screw speed of the extruder. Faster line speeds result in a thinner film, and faster screw speeds result in thicker films. The polyester carrier also acts as a support sheet for the thin clear film in subsequent operations such as coating and laminations. In this example a 2.5-inch extruder was used to extrusion coat a one mil PVDF/acrylic clear topcoat onto a two mil gloss polyester carrier. The compounded pellets were dried in a desiccator dryer at 130° F. for two hours prior to being fed into the extruder. The extruder had five heating zones which were set at (1) 390° F., (2) 400° F., (3) 410° F., (4) 420° F., (5) 420° F. The screw speed was held at 60 rpm The matte chill roll was maintained at 75° F. for the entire run. A nip pressure of 20 lbs and no corona treatment was used to enhance the bond between the film and the polyester carrier. At these settings a nominal one mil thick clear film was produced with a corresponding weight of 38 gm/m². This extusion coating produced a roll which is composed of two mil gloss PET with a one mil clear Avloy® topcoat. The extruded Avloy® topcoat, however, bound to the two mil gloss PET carrier and would not release from the carrier.

Using the same extrusion coating conditions as above two more rolls were produced using Hostaphan 1545 silicone coated polyester as its carrier. While extruding the clear coat formulation onto the siliconized PET carrier, the extruded clear film wrapped around the chill roll due to a weak bond between the extruded film and the siliconized polyester. This problem was resolved by exchanging the gloss chill roll for a matte chill roll, which has a more facile release of the extruded film. This roll was subjected to further lab evaluation. The reverse side of the clear Avloy® clear coat was embossed by the matte finish from the matte chill roll. However, when this roll was coated with a standard solvent based Avloy® white color coat, this coated film was dried and was then laminated (rubber roll at 400° F., 10 ft/min) onto a primed 19 mil thick gray ABS sheet. When the carrier was removed, the laminated sample showed no texture from the matte chill roll. When this sample was thermoformed (19 seconds, 330° F. surface temperature), texture from the matte roll surface was evident. The release of the extruded film from siliconized PET was weak, having a peel strength of 10 gm/in. Similar rests were obtained when this clear coat formulation was extrusion coated onto siliconized release paper, but the extruded film replicated the texture of the paper stock.

A roll using the same conditions described above with polypropylene film as a carrier was extrusionoated under the same conditions. The polypropylene carrier distorts when the hot extrudate touches its surface, causing wrinkles in the finished film; however, extruded Avloy® clear coat releases easily from the polypropylene carrier. In a later trial when polypropylene coated paper was used as the carrier, the hot extrudate did not distort or wrinkle the polypropylene coated paper due to the support afforded by the paper stock. The Avloy® clear topcoat released easily from this carrier but it revealed texture transferred from the paper stock.

EXAMPLE 2

A comparative evaluation was made between the formulation described in Example 1 and the following formulation:

| INGREDIENTS | PARTS |
| --- | --- |
| 1 Kynar 720<br>Polyvinylidene fluoride (PVDF)<br>Elf Atochem North America | 70.0 |
| 2 VS100<br>Polymethyl methacrylate (PMMA)<br>Atohaas | 30.0 |
| 3 Cyasorb P 2098<br>UV stabilizer<br>2 hydroxy-4-acrylooxyethoxybenzophenone<br>Cytec | 2.0 |

The VS100 is a polymethyl methacrylate (PMMA), known as Plexiglas, which is compatible with PVDF and has a temperature/viscosity profile closely matching the Kynar 720; this formulation was selected for superior extrusion melt strength. The VS-100 has a Tg of about 98–99° C., and a melt viscosity (measured in Pasmec) at 100, 500 and 1,000 l/sec of 940, 421 and 270, respectively. The formulation of Example 1 wrapped around the gloss chill roll during the extrusion coating process. To prevent this failure a new formulation was developed which would not bind to the siliconized PET and would release easily from a gloss chill roll. The tackiness of this formulation was reduced by increasing the Kynar 720 level and by increasing Tg of the acrylic; the Tg of Elvacite acrylic 2042 and VS100 acrylic is 65° C. and 100° C., respectively. The Kynar acrylic ratio was changed from 65/35 to 70/30. This formulation easily released from a siliconized polyester web and a high gloss chill roll, and during a later trial it released from standard polyester web.

This formulation was compounded using a twin screw extruder manufactured by Werner Pfleiderer, model 53MM, to obtain uniform blended pellets. The twin screws were co-rotating and its configuration was designated Avery Dennison "A." The two resins were dried in a dryer at 160° F. for four hours before being extruded into pellets, and during the extrusion process a vacuum vent in the compression zone of the screw was used to further remove moisture and other volatile components. The feed into the extruder was starved, and the heating elements or zones of the extruder were set at: (1) 100° F., (2) 360° F., (3) 360° F., (4) 360° F., (5) 360° F., (6) 360° F., (7) 360° F., but the observed values were (1) 108° F., (2) 360° F., (3) 374° F., (4) 366° F., (5) 360° F., (6) 355° F., (7) 358° F. The screw was maintained at 66 rpm. The melt temperature of this formulation was maintined at 355° F. and a screen pack consisting of three different wire meshes: 20, 40, 60, was used to clean the melt stream. This material was peetzed.

The pellets were extrusion coated on a 1.42 mil high gloss silicone coated PET designated Hostaphan 1545. (The extruded material had a melt viscosity (Passec) at 100, 500 and 1,000 l/sec of about 803–829, 373–376 and 248–250, respectively.) The polyester carrier provides a smooth glossy surface upon which the hot extrudate can form a thin clear film ranging from about 0.1 mil to about 2–3 mils thick. The thickness of the resulting clear films are adjustable by the extrusion coating line speed and the screw speed of the extruder, as described previously. The polyester carrier supports the thin clear film in subsequent operations such as coating and laminations. In this example a 6.0 inch extruder with a single flight screw was used to extension coat a one mil PVDF/acrylic clear topcoat onto a 1.42 mil high gloss silicone coated polyester carrier. The compounded pellets were dried in a desiccator dryer at 130° F. for two hours prior to being fed into the extruder. The extruder had eleven heating zones set at: (1) 380° F., (2) 370° F., (3) 340° F., (4) 340° F., (5) 340° F., (6) 340° F., (7) flange 340° F., (8) adapter 1 (340° F.), (8) adapter 2 (340° F.), (9) pipe 350° F., (10) end cap 100° F., and (11) die 350–365° F.; the die was a T-slot and had five zones: (1) 365°, (2) 360°, (3) 350°, (4) 360°, and (5) 365°. The die temperature profile was used maintain uniform melt flow across the die. The screw speed was held at 15 rpm and a line speed of 170 ft/min. The high gloss chill roll was maintained at 60° F. for the entire run. A harder durometer and smaller diameter nip roll produced the highest nip pressure and the highest gloss finished film. A 200 mesh welded screen pack was used to clean the melt stream. At these settings a clear one mil thick film was produced with a corresponding weight of 38 gm/m$^2$. The finished film was a high gloss film. No corona treatment was used.

Two rolls were produced in the above extrusion coating run; a first roll had a coating thickness of one mil, and a second roll had a coating thickness of 0.6–0.7 mil. The material was subsequently coated with a solvent based color coat as in FIG. 3 using a white lacquer comprising 53.6 parts clear vehicle, 12.5 parts cyclohexanone solvent, 33.4 parts exterior white pigment and trace amounts of iron yellow, carbon black and iron red pigments. The oven zones were set at 160°, 240°, and 350° F. The line speed was held at 25 ft/min. The applicator roll was held at 35 ft/min, and the metering roll was held at 7 ft/min. Under these conditions 45 gm/m2 of dried color coat was deposited onto the one mil PVDF/acrylic topcoat.

This laminate had the following construction: 1.42 mil gloss PET, a nominal one mil clear PVDF/acrylic topcoat, and a 1.0 mil color coat. This construction was laminated to a primed 20 mil gray ABS backing sheet as shown in FIG. 4.

A size coated ABS sheet can be made by coating the size coat formulation (described below) on a polyester carrier as shown in FIG. 2 and then transfer laminating the material to an ABS sheet as shown in FIG. 3. For test purposes, Hoechst Celanese 2000, a two mil gloss PET film, was coated by a reverse roll coater with the size coat material. Under these conditions, 67 gm/m$^2$ acrylic size coat is deposited on the PET carrier. This material is laminated as shown in FIG. 3 to an extruded sheet of General Electric Cycolac LS, a 19 mil thick gray ABS sheet. During lamination, the acrylic size coat is transferred to the ABS backing sheet. The size coat formulation is shown below:

| SIZE COAT FORMULATION | |
|---|---|
| INGREDIENTS | PARTS |
| 1 Xylene | 61.0 |
| 2 Acrylic resin | 29.0 |
| 3 MEK | 10.0 |

The acrylic resin was Elvacite 2009 from ICI Acrylics, Inc., Wilmington, Del. The finished laminate was thermoformed and injection molded as illustrated in FIG. 6. Some phase separation was noted after thermoforming, resulting in drop of gloss and DOI for the clear coat/color coat. The foil can used as an in-mold foil, without vacuum forming, for shallow draw parts.

EXAMPLE 3

The following formulation did not exhibit the phase separation problem. An extrudable clear coat polymeric material was pelletized, and the pellets were fed to an extruder for extrusion coating the resulting clear coat onto the surface of a carrier sheet traveling past the extruder die slot.

| INGREDIENTS | PARTS |
|---|---|
| 1 Kynar 720<br>Polyvinylidene fluoride (PVDF)<br>Elf Atochem North America | 60.0 |
| 2 VS100<br>Polymethyl methacrylate (PMMA)<br>Atohaas | 40.0 |
| 3 Tinuvin 234<br>UV stabilizer<br>Hydroxyphenylbenzotriazole<br>Ciba-Geigy | 2.0 |

This formulation was selected for superior extrusion melt strength and to reduce phase separation of the Kynar 720 resin. The formulation was compounded using a twin screw extruder (Werner Pfleiderer, model 53MM) to obtain uniformly blended pellets. Extrusion was similar to that described in Example 2, except that the two resins were dried in a dryer at −40° w dew pt. and 130° F. for four hours before being extruded into pellets. The screw was maintained at 63 rpm using 600–660 H.P. and a corresponding current of 54–58 amps. The melt temperature of this formulation was maintained at 356° F. and screen pack consisting of three different wire mesh: 20, 40, 60, was used to clean up the melt stream. This material was pelletized.

This material was extrusion coated onto a two mil high gloss polyester film, American Hoechst 2000, to form a thin clear film ranging from about 0.1 mil to about 2–3 mils thick. (The extruded material had a melt viscosity (Pas·sec) at 100, 500 and 1,000 l/sec of about 752, 366 and 242, respectively; a melting temperature of about 162° C., and a Tg of about 32.6° C.) The polyester carrier was used as a support for the thin clear film in subsequent operations such as coating and laminations. In this example a 2.5 inch extruder was used to extrusion coat a one mil PVDF/acrylic clear topcoat onto a two mil gloss polyester carrier. The compounded pellets were dried in a desiccator dryer at 130° F. for two hours prior to being fed into the extruder. The extruder had five heating zones which were set at (1) 390° F., (2) 400° F., (3) 410° F., (4) 420° F., (5) 420° F, and the screw speed was held at 60 rpm with a corresponding line setting of 3.47 ft/min. The high gloss chill roll was maintained at 60° F. for the entire run. At these settings a clear one mil thick film was produced with a corresponding weight of 38 gm/m². No corona treatment was used. However, when a corona treatment was used on the polyester web prior to reaching the extrusion coating nip, half moon defects were noted in the clear one mil film. The electrical charge left on the polyester web from the corona treatment did not dissipate before reaching the extrusion coating nip, distorting the clear film and resulting in half moon shaped defects.

Two rolls were produced in the above extrusion; one roll had no corona treatment, and the other roll was subjected to corona treatment. The film was subsequently coated with a solvent based color coat as in FIG. 3. This roll was reverse roll coated using a red color coat (see formulation below). During this run, the ambient temperature was 76° F., and the relative humidity was 25%. The line speed was held at 15 ft/min. The first oven zone was set at 240° F. and the second oven zone was set at 250° F. The applicator roll ratio was held at 115% of line speed, and the metering roll was held at 20% of line speed. Under these conditions 25 gm/m² of dried color coat was deposited onto the one mil PVDF/acrylic topcoat.

| RED AVLOY ® COLOR COAT | |
|---|---|
| INGREDIENTS | PARTS |
| 1 Clear vehicle for Avloy ® color coat | 74.32 |
| 2 DPP Red BO 460-36351 | 11.26 |
| 3 Magenta D-60 dispersions | 7.47 |
| 4 93 exterior white | 0.07 |
| 5 D-60 violet dispersions | 1.88 |
| 6 Methyl propyl ketone | 2.50 |
| 7 Cyclohexanone | 2.50 |

This construction had the following structure: two mil gloss PET, one mil clear PVDF/acrylic topcoat, and 0.6 mil color coat. This construction was laminated to a primed 20 mil gray ABS backing sheet (L1826) as shown in FIG. 4. The material was thermoformed and injection molded (see FIG. 6).

These samples exhibited good gloss and a DOI above 60. (DOI is measured on the HunterLab Dorigon D47R6 instrument.) The foil can also be placed in the injection mold without thermoforming and in-mold formed for shallow draw parts as described earlier. For deep draw parts the foil is first laminated to a flexible thermoplastic backing sheet, i.e. vinyl, urethane, or nylon. This flexible backing sheet aids in the distensibility of these foils. Such lamination (see FIG. 3) is performed under the lamination conditions described in Example 2. These laminates can also be injection molded without thermoforming by preheating the laminate and using presser or vacuum to cause the material to take the shape of the mold face prior to injection of the molten plastic. The flexible backing is selected for compatibility with the injection cladding resin.

EXAMPLE 4

The following formulation of an excusable clear coat polymeric material was pelletized and the pellets were fed to an extruder for extrusion coating the resulting clear coat onto the surface of a carrier sheet traveling past the extruder die slot.

| INGREDIENTS | PARTS |
|---|---|
| 1 Kynar 720<br>Polyvinylidene fluoride (PVDF)<br>Elf Atochem North America | 65.0 |
| 2 VS100<br>Polymethyl methacrylate (PMMA)<br>Atohaas | 35.9 |
| 3 Tinuvin 234<br>UV stabilizer<br>Hydroxyphenylbenzotriazole<br>Ciba-Geigy | 2.0 |

This formulation was compounded using the twin screw extruder described in Examples 2 and 3 to obtain uniformly blended pellets. The twin screws were co-rotating. Extrusion was similar to that described in Example 2, except that the two resins were dried at 130–150° F. for 2–3 hours before being extruded into pellets, and the heating elements or zones of extruder were observed at (1) 101° F., (2) 358° F., (3) 339° F., (4) 359° F., (5) 359° F., (6) 361° F., and (7) 357° F. The screw was maintain at 63 rpm using 700 H.P. and a corresponding current of 68–78 amps. The melt temperature of this formulation was maintained at 355° F. and a screen pack consisting of three different mesh screens: 20, 40, 60 was used to clean the melt steam his material was pelletized.

This formulation was extrusion coated onto a two mil high gloss American Hoechst 2000 polyester film. This polyester carrier provides a smooth glossy surface upon which the hot exudate formed a thin clear film ranging from about 0.1 mil to about 2–3 mils thick. In this example a 2.5 inch extruder was used to extrusion coat a one mil PVDF/acrylic clear topcoat onto a two mil gloss polyester carrier. The compounded pellets were dried in a desiccator dryer and extruded under heat and at a speed similar to the conditions described in Example 3. The high gloss chill roll was maintained at 60° F. for the entire run. At these settings a clear one mil thick film was produced with a corresponding weight of 38 gm/m². No corona treatment was used. When a higher corona treatment was used on the polyester web prior to reaching the extrusion coating nip, half moon defects were noted in the clear one mil film. The electrical charge left on the polyester web from the corona treatment did not dissipate before reaching the extrusion coating nip, distorting the clear film and resulting in half moon shaped defects.

Two rolls were produced in the above lab extrusion; one roll had no corona treatment, and the other roll was subjected to corona treatment. The film was subsequently coated with a solvent based black Avloy® color coat (using a Bird bar) and was then dried. The solvent based black color coat had the following formulation:

| INGREDIENTS | PARTS |
| --- | --- |
| 1 N-methyl pyrollidone | 38.00 |
| 2 Elvacite 2042 | 4.06 |
| 3 Kynar 10052 | 12.00 |

The resins are dissolved in the solvent under heat at 130° F. The following pigment dispersion is then added:

| INGREDIENTS | PARTS |
| --- | --- |
| 1 Black dispersion -- GCW #428-A056 | 20.00 |
| 2 N-methyl pyrrolidone | 25.40 |
| 3 Exterior white | 0.54 |

The resulting foil was laminated to an acrylic primed 30 mil black ABS sheet with a rubber roll held at 400° F. and a speed of 14 ft/min. The resulting laminate was draped in the thermoformer for 29 seconds, and the laminate sheet reached a surface temperature of 340° F. This draped sample was compared with a similarly prepared sample (from Example 3) to determine relative levels of hazing. The black Avloy® prepared from the film in Example 3 showed the least amount of hazing, and the black Avloy® laminate prepared from the film of Example 4 showed the most hazing. No further evaluation was done; Example 3 was deemed superior because the higher acrylic content in these formulae is believed to retard phase separation.

EXAMPLE 5

A comparative evaluation was made between the formulation in Example 2 and the following formulation:

| INGREDIENTS | PARTS |
| --- | --- |
| 1 Kynar 2850<br>Polyvinylidene difluoride (PVDF)<br>Elf Atochem North America | 60.0 |
| 2 VS100<br>Polymethyl methacrylate (PMMA)<br>Rohm and Haas | 40.0 |
| 3 Tinuvin 234<br>UV stabilizer<br>Ciba-Geigy | 2.0 |

Kynar 2850 is the extrusion grade PVDF copolymer. The Kynar 2850 has a melting temperature of about 155° C., a Tg of about −35 to −40° C., and a melt viscosity (measured in Pas·sec) at 100, 500 and 1,000 l/sec of 1,170–1,273, 494–508 and 326–330, respectively. The PMMA is compatible with the PVDF and its temperatrelviscosity profile closely matches the Kynar 2850. This formulation was selected for better resistance to phase separation which can result in haze on the finished part.

More specifically, the recrystallization process of Kynar resin is the principal driving force behind the phase separation process. The melting point of the homopolymer Kynar 720, Tm=165–170° C., is higher than the melting point of the copolymer Kynar 2850, Tm=155–160° C. This melting point difference illustrates the higher crystallity of the homopolymer over the copolymer. Such a melting point difference can be explained by the relative structural differences of these polymers. The PVDF homopolymer is a linear polymer in which the molecules can easily align themselves in parallel fashion to form a crystal, such as, polyethylene; whereas the random copolymer of PVDF and hexafluoropropylene cannot form a similar linear structure, since these linear chains have pendent-CF3, trifluoromethyl groups which partially block the alignment of these chains. Hence recrystallization of the Kynar resin in the finished PVDF/acrylic film resulted in more haze in the finished part. Kynar 2850 has less tendency than Kynar 720 to crystallize, and produced a clearer PVDF/acrylic film upon heat against at 180° F. for three days.

The formulation was compounded using a twin screw extruder to obtain uniform a blended pellets. The two resins were dried before being extruded into pellets. During the extrusion process a vacuum vent in the compression zone of the screw was used to further remove moisture and other volatile components. The heating elements or zones of extruder were set at (1) 100° F., (2) 380° F., (3) 380° F., (4) 385° F., (5) 385° F. 385° F. The screw was maintained at 70 rpm. The melt temperature of this formulation was maintained at 380° F. and a screen pack consisting of three different wire meshes (20, 40 and 60) was used to clean the melt stream. This material was pelletized.

The above formulation was extrusion coated on two mil high gloss Hostaphan 2000 polyester carrier film which provides a smooth glossy surface upon which the hot extrudate can form a thin clear film ranging from 0.1 mil to 2 mils thick. (The extruded material had a melt viscosity (Pas·sec) at 100, 500 and 1,000 l/sec of about 888, 405 and 266, respectively; a melting temperature of about 147° C., and a Tg of about 23–33° C.) The thickness of the resulting films can be altered by the extrusion coating line speed and the screw speed of the extruder as illustrated in FIG. 1. While faster line speeds result in a thinner film, faster screw speeds result in thicker films. The polyester film also acts as a carrier to support the thin clear film in subsequent operations of coating and lamination. In this example a 1.75 inch lab extruder was used to extrusion coat a one mil PVDF copolymer/acrylic clear topcoat onto a two mil high gloss polyester carrier.

The compounded pellets were dried in a desiccator dryer at 150° F. for two hours prior to being fed into the extruder. The extruder had ten heating zones which were set at (1) 330° F., (2) 380° F., (3) 380° F., (4) 405° F., (5) 415° F./clamp, (6) 420° F./tube, (7) 420° F, (8) 420° F., (9) 420° F. and (10) 406° F./die; the die was coat hanger and the melt was maintained at 434° F. The screw speed was held at 166 rpm with a corresponding line speed of 150 ft/min. The high gloss chill setting was maintained at 70° F. for the entire run. A welded screen pack was used to clean the melt stream. At these settings a one mil clear coat was produced with a corresponding weight of 38 gm/m². The finished film was high gloss, but had some microgels and some small contaminants were observed. The defects were not objectionable in finished parts. No corona treatment was used.

One roll of the formulation produced in the above production extrusion coating run was coated in the lab with a teal metallic Avloy® color coat. This material was laminated to primed ABS. The resulting laminate was thermoformed, die cut, and injection clad to yield a finished part.

EXAMPLE 6

This example illustrates the extrusion coating of a non-PVDF/acrylic formulation, in this case a thermoplastic aliphatic urethane from Morton (PN-3429). Such topcoats can be used as an exterior clear coat in some exterior automotive applications or for interior automotive applications such as an interior clear coat for TC laminates.

Morton PN3429 pellets were dried for four hours at 130° F. These dried pellets were extrusion coated using a pilot line extrude with a 2.5 inch single screw. All heating zones from feed to die were held at 325° F. The chill roll was set at 80° F. and at a nip pressure of 20 lbs. This material was extrusion coated onto a 2 mil gloss polyester carrier (Hosthaphan 2000) at a screw speed of 50 rpm and a line setting of 3.0. Under these conditions, a 2.0 mil clear coat was coated on the polyester carrier. Increasing the line setting resulted in the deposition of a one mil clear coat on the polyester carrier.

the sheet goes down the line it is cooled by passing it over chilled steel rolls and finally is wound up into a roll. The fral sheet comprises about 1.5 mil acrylic layer and a 28.5 mil ABS layer for a total thickness of 30 mils.

The following run conditions and data wer tabulated:

|   |   |   |   |   |   |   |   |   |   |   |   |   | ADAPTER |   | FLANGE |   |   |
|---|---|---|---|---|---|---|---|---|---|---|---|---|---|---|---|---|---|
| 1 | 2 | 3 | 4 | 5 | 1 | 2 | 3 | 4 | 5 | 6 | A1 | A2 | Mixer | Slide | Coextrusion block |
|   |   |   |   |   |   |   | INITIAL |   |   |   |   |   |   |   |   |
| 435 | 435 | 410 | 450 | 450 | 480 | 460 | 410 | 451 | 440 | 450 | 400 | 400 | 410 | 400 | 400 |
|   |   |   |   |   |   |   | FINAL |   |   |   |   |   |   |   |   |
| 430 | 410 | 420 | 409 | 404 | 480 | 470 | 430 | 450 | 460 | 460 | 400 | 400 | 480 | 450 | 400 |

EXAMPLE 7

The purpose of this trial is to make a coextrusion sheet for a base coat/clear coat paint film.

Currently a single layer ABS sheet, 0.0201" to 0.030", is sized for adhesion by transfer laminating either at the extruder or at a separate operation with an acrylic layer (Elvacite 2009) that has been solvent cast onto a polyester carrier. The polyester carrier is removed and discarded by coextruding this acrylic layer with the ABS. The need to cast the acrylic to a polyester carrier film on a reverse roll coater and subsequently transfer laminate it to ABS is eliminated, thereby simplifying the manufacture of the finished product.

This example illustrated an alternative method of producing a primed ABS sheet which can be laminated with a base coat/clear coat foil to produce a laminate product. This primed ABS sheet has been produced by the coextrusion of a composite acrylic/ABS sheet on a thick film line. This coextrusion eliminated the need to solvent cast the acrylic size coat onto a polyester carrier using a reverse roll coater and subsequently laminating this foil to ABS. Such a coextrusion eliminated two operations in the manufacturing process of laminated sheet; one coating and one lamination operation. Eliminating these operations can increase both the laminating and coating capacity of a plant, and lower the cost and time required to produce the laminate.

On a thick film line, two extruders were used to coextrude a composite acrylic/ABS sheet. Extrude A was fed acrylic resin and not vented; whereas, extruder B was fed ABS resins and was vented to further remove water ant other volative gases. Both the acrylic resin and the ABS resin require drying of excessive moisture before extruding. This is accomplished by drying the resin in a desiccant dryer for at least two hours at 150° F. for the acrylic, and 170° F. for the ABS. The resin needs to be below 0.08% moisture content to prevent problems with extrusion. Typically it is run with moisture content between 0.02% to 0.04% during extrusion.

Dried resin pellets of each material are fed into the hoppers on the top of each extruder via vacuum tubes. From the hoppers the pellets are gravity fed into the feed section of the extruders' barrel. It is screw fed through the barrel and heated to a molten state. The two resins in each extruder are fed through their respective barrel sections to a single feed block and then into the die of the extruder. The molten sheet exits the die and runs trough a three roll calendaing (polishing) stack which polishes both sides of the sheet. As the sheet goes down the line it is cooled by passing it over chilled steel rolls and finally is wound up into a roll. The fral sheet comprises about 1.5 mil acrylic layer and a 28.5 mil ABS layer for a total thickness of 30 mils.

The reason for changes in the melt temperatures was to improve movement of molten resin through the extruder by increasing melt temperature to reduce the molten viscosity. Other operating conditions were as follows:

| Die Temp. | 440° F. all zones |
|---|---|
| Melt Temp. | 408° F. |
| Line Speed | 39.8 ft/min |
| Screw -- Ext. A LD ratio | 24:1 |
| Screw - Ext. B LD ratio | 32:1 |
| Screen pack at breaker plate | A = 2,40 mesh screens |
|   | B = 3 @ 20, 40 & 60 mesh screens |

| Polished roll temperature | START | END |
|---|---|---|
| TOP | 170 | 170 |
| MIDDLE | 150 | 150 |
| BOTTOM | 145 | 180 |

The reason for change in the middle and bottom from start to end was to set the sheet in calendar stack. Extruder "A" was not vented—"B" was vented for moisture and gas removal.

|   |   | START | END |
|---|---|---|---|
| Screw speed (rpm) | A | 8.4 | 6.5 |
|   | B | 64.2 | 7.5 |
| Back pressure (psi) | A | 3,010 | 2,920 |
|   | B | 4,240 | 4,390 |
| Coextruder thickness (mil) |   |   |   |
|   | A layer | 2.5 | 1.5 |
|   | B layer | 27.5 | 28.5 |

Two base coat/clear coat films (mid-gloss black and emerald green) were fed into the calendaring stack and laminated to the acrylic side of the coextrusion. The carrier was then removed. This combines the coextrusion of the sized backing sheet with the lamination of base coat/clear coat foil so the resulting laminate is ready to be thermoformed prior to subsequent molding of exterior automotive parts.

EXAMPLE 8

The following formulation of an extrudable color coat material was pelletized, and the pellets were fed into an extruder in an extrusion coating station. The extruded color coat was deposited on the extrusion coated web passing below extruder die slot.

| INGREDIENTS | PARTS |
|---|---|
| 1 Kynar 720<br>Polyvinylidene fluoride<br>Atochem | 48.0 |
| 2 Jet Black No. 1<br>Copper chromate black spinel<br>The Shepherd Color Company | 20.0 |
| 3 VS100<br>Polymethyl methacrylate (PMMA)<br>Atohaas | 32.0 |

This formulation was compounded using the Werner Pfleiderer Model 53MM twin screw extruder to obtain a uniform blend. The two resins were dried in a desiccator hopper with a 0° F. dew point at 150° F. for eight hours before being extruded into pellets. During the extrusion process the vacuum vent in the compression zone of the screw was used to further remove moisture and volatile components. The dried resins of the color coat were fed into the extruder. The seven heating zones of the extruder were set: (1) 100° F., (2) 370°F., (3) 370° F., (4) 370° F., (5) 370° F., (6) 370° F., (7) 370° F. The screw was maintained at 64 rpm using 600–670 H.P. and a correponding current of 54–59 amps. The melt temperature at the die was maintained for 367° F., and a screen pack consisting of three different wire meshes; 20, 40, 60 was used to clean the melt stream. The material was pelletized. Press outs were used to monitor the uniformity of the blend.

The above formulation was extrusion coated onto an extrusion clear topcoated web to form a one mil color coat on the clear topcoat with a corresponding weight of 44 gm/m$^2$. The pellets were dried in a desiccator dryer at 0° F. dew point, 150° F. for eight hours prior to extrusion coating the color coat. The 2.5 inch extruder was held at 60 rpm and the five heating zones were set at: (1) 390° F., (2) 400° F., (3) 410° F., (4) 420° F. This roll was laminated to 30 mil primed black ABS on the Acromark (400° F., 2×, 8 ft/min); it was, also laminated to primed gray ABS to check for opacity. Both laminates were thrmoformed.

The previous description related to use of the invention in producing exterior and interior automotive body panels. The following description relates to applications of the invention to the manufacture of outdoor siding panels.

FIG. 2 schematically illustrates one embodiment of the invention in which the clear coat film is extrusion coated onto a flexible carrier sheet comprising a 0.60 mil thick high gloss polyester film such as that sold under the designation Skyrol SM30 polyester film by SKC America Inc. The carrier sheet is release coated with a matte release coat as described below.

The clear coat preferably comprises a solid polymeric material that can be extruded as a transparent film. The polymeric material can comprise various acrylics, urethanes, vinyls, fluoropolymers, and blends thereof. Polyvinylidene fluoride (PVDF) and polyvinyl fluoride (PVF) are preferred fluoropolymers. A presently preferred extrudable polymeric material comprises a blend of PVDF and acrylic resins. The preferred acrylic resin is a polymethyl methacrylate polymer (PMMA). although a polyethyl methacrylate polymer (PEMA) also can be used. In a presently preferred formulation, the clear coat material comprises from approximately 50 to 75 percent PVDF and from approximately 25 to 50 percent acrylic resin, by weight of the total solids present in the PVDF/acrylic formulation. These solids ranges are based on the relative proportions of the PVDF and acrylic components only in the clear coat formulation. Other minor amounts of solids such as Uw stabilizers, pigments, and fillers also may be contained in the clear coat formulation.

In one embodiment the dry film thickness of the topcoat is approximately 0.1 to 1.5 mils. The preferred topcoat formulation produces a dry film form exterior weatherable coating having desired properties of hardness and abrasion resistance, along with weatherability properties such as Uw resistance and resistance to water and humidity exposure. The topcoat formulation also enhances having transferred to it a low gloss surface from a matte release coat described below. In one embodiment, the topcoat is formulated from a thermoplastic synthetic resinous coating which, in dry film form, softens and deforms under elevated temperatures so that three-dimensional impressions can be formed in its exterior surface during the embossing step, While replicating the micro-roughness from the matte release coat to produce the low gloss surface.

The clear coat polymer blend is preformed as an extrudable material in pellet form, fed from a hopper to anelder having an extruder die above the surface of the carrier sheet. The carrier sheet is provided as a supply roll and is unwound and travels at a high line speed past the extruder. In one embodiment, line speed exceeds 200 feet per minute. The die extrudes a coating of the melted polymeric material through a narrow slot that uniformly coats the carrier sheet which is continuously moving at high speed past the extruder die slot. The entire thickness of the coating is immediately cooled thereafter, as described below. The extrusion carrier is wound as a take-up roll.

Referring to FIG. 2, the supply roll of the carrier film is shown with the carrier sheet passing around a series of rolls prior to applying a release coat to the surface of the carrier by a conventional gravure cylinder. The release coat is preferably a thermosetting resinous material which, when exposed to heat for drying it, also crosslinks and permanently bonds as a surface film adhered to the carrier sheet. The solids contained in the matte release coat preferably include, as a principal component, one or more crosslinking agents to provide good adhesion of the dried crosslinked coating to the polyester carrier film. In one embodiment, the matte release coat formulation includes a primary crosslinking resin such as a vinyl resin that bonds to the polyester film. A suitable vinyl resin is a medium molecular weight vinylchloride-vinylaceate resin known at VAGH, described in more detail in Example 8 below. This vinyl resin can be present in an amount up to approximately 20% of the total solids in the matte release coat. In addition, the matte release coat can include a secondary crosslinking resin to improve release of the clear coat from the matte release coat. In one embodiment, the secondary crosslinking resin can be an acrylic modified alkyd resin such as the resin known as Lankyd 13-1245 also described in more detail in Example 8. This secondary crossking resin comprises from about 5% to about 20% of the total solids of the matte release coat. The matte release coat further includes a suitable catalyst for accelerating the crosslinking process, typically comprising from about 1 % to 4% of the total solids in the matte release coat.

The resinous components of the matte release coat composition are mixed with suitable solvents. In one embodiment, the resins are mixed with a primary resin solvent such as methyl isobutyl ketone (MIBK) which comprises about 65% to about 85% of the total solvent in the formulation. A secondary resin solvent such as isopropyl alcohol (IPOH) is useful in retarding crosslinking of the resins in solution. The secondary resin solvent comprises from about 5% to about 20% of the total of solvent.

The matte release coat formulation is prepared by dissolving the primary crosslinking resin in the primary and secondary resin solvents by mixing and then adding the secondary crosslinking resin, together with a primary matting agent, preferably in the form of a filler comprising a fine particulate inert inorganic material. In one embodiment, the filler comprises aluminum silicate with an average particle size of about 4.8 microns. The filler contained in the formulation comprises up to about 25% of the total solids in the matte release coat. The fine picule filler is thoroughly dispersed in the resin and resin solvent blend, preferably under elevated expert from about 100° F. to 120° F.

In use, when the matte release layer dries and crosslinks, it forms a chemical matte coating on the surface of the carrier sheet. The matte surface is controlled by the amount and particle size of the filler. The fine particles project through the dried exterior surface of the matte release coat to form, on a microscopic scale, a surface with micro-roughness that transfers to the surface of the dried topcoat a replicated micro-roughness that produces light scattering, resulting in a low surface gloss on the topcoat.

The matte release coat formulation also includes a release agent to enhance freely releasing the carrier and its matte release coat from the topcoat during the transfer process. The release agent preferably includes a wax component such as a polyethylene wax which melts at elevated temperate to allow easy hot release of the release coat. The wax component is normally suspended in the matte release coat at temperatures below the temperature where the polyethylene wax will start to swell or dissolve in the solvent blend. A significant viscosity increase can be observed above 90° F. indicating swelling and or partial dissolving of the polyethylene wax. The wax component, in its suspended or particulate form, acts as a matte agent to enhance transfer of the low surface gloss to the clear coat. The temperature of the extrusion at the transfer-embossing point of the process heats the laminate (including the release coat) to melt the wax sufficiently for it to enhane the release properties of the matte release coat. Preferably, the melting point of the wax is below the temperature at which the release-coated carrier is stripped from the laminate. In a preferred polyethylene wax known as Shamrock S-381-N1 (described in Example 8 below), the melting point of the wax is about 206° F. Stripping of the release-coated carrier can be carried out at lower temperatures but at about 80° F. to 140° F. above the melt point of the wax, the wax further enhances release.

The wax, which melts at relatively higher temperatures as it dries, can have a crystalline or semi-crystalline structure, and at relatively lower temperatures is believed to crystallize and reform particles which affect the matte transferred to the laminate. In one preferred form of the release coat formulation, the polyethylene wax comprises from 12% to approximately 25% of the solids contained in the matte release coat.

The release agent contained in the matte release coat formulation further includes a silicone resin component which combines with the polyethylene wax to enhance free release of the clear coat from the matte release coat at elevated temperatures. In one embodiment, the silicone resin comprises from approximately 2.5% to 25% of the solids contained m the matte release coat formulation. Release is improved and the lower gloss is transferred when the wax and silicone resin are used in combination in the matte release coat.

Figure 17:
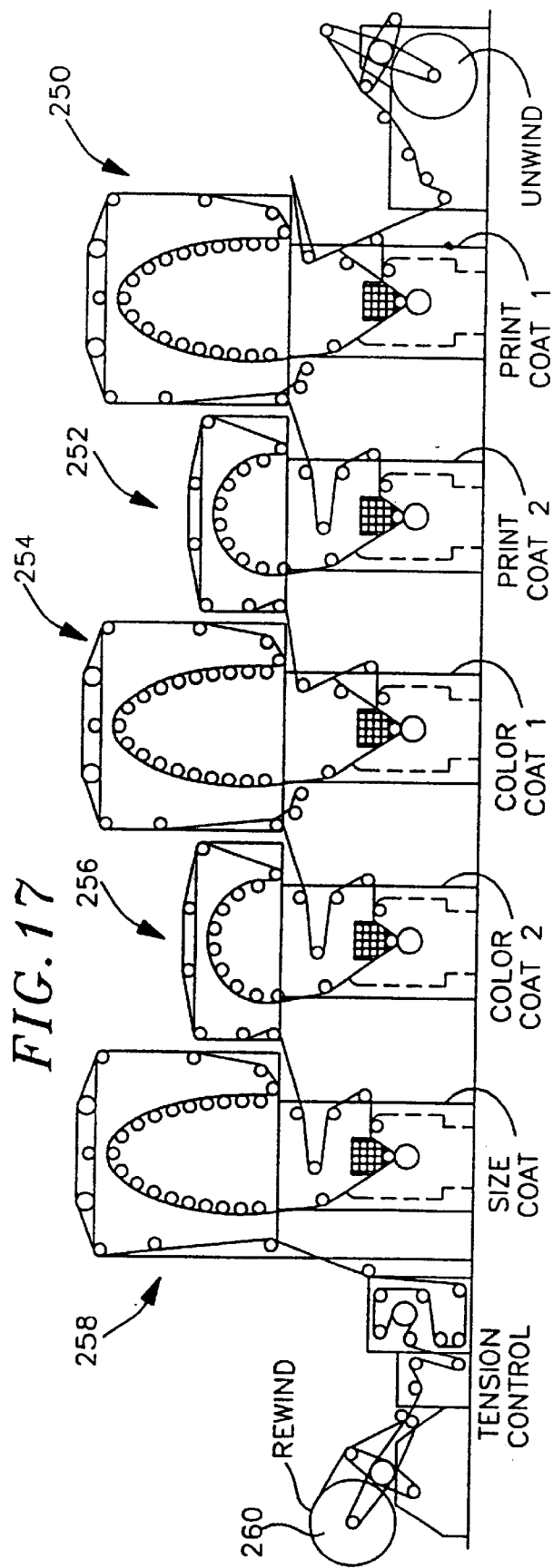
FIG. 17 is a schematic diagram illustrating a process for making siding panels comprising the initial steps of applying a series of grain prints or patterns, followed by one or more color coats and a size coat.

FIG. 17 is a schematic diagram illustrating successive steps used in one embodiment to apply multiple coatings to the extruded PVDF/acrylic tasrent film to produce a decorative foil having a wood grain appearance. In the illustrated process there are two wood grain print stages 250 and 252, followed by two continuous color coat stages 254 and 256 and a continuous size coat stage 258.

The wood grain print coats can be formulated from a thermoplastic synthetic resinous coating composition containing an acrylic resin, such as polymethyl methacrylate or polyethyl methacrylate, or mixtures thereof, including methacrylate copolymer resins and minor amounts of other co-monomers; or the print coats can be made from a fluoropolymer resin, such as polyvinylidene fluoride (PVDF) or polyvinyl fluoride (PVF); or the print coats can be formulated of blends of fluoropolymer and acrylic resins. The level of pigmentation in the coating can range up to about 40% by volume on a solids basis, depending upon the depth of color needed for the particular wood grain pattern being printed. However, less than about 10% pigment by volume is preferred. The dry coat weight of the wood grain print coats ranges from about 0.1 to about 2.0 $gm/m^2$. Example 8 below describes in more detail the pigments that can be used in the wood grain printing inks.

Referring again to FIG. 17, the foil containing the dried wood grain print coats passes from the second drying oven 252 to a gravure print station where a first color coat is coated on the finished, dried second grain wood grain print coat. After first color coat is dried a second color coat is applied in the fourth gravure station 256. The color coat is then passed through an impinging air oven operated at a temperature of about 225° F. for drying the second color coat. The foil containing the color coats next passes from the fourth drying oven 256 to a gravure print station where a size coat is coated on the dried color coat. The size coat is then passed through an impinging air oven 258 operated at a temperature of about 225° F. for drying the size coat. The size coat is applied using a gravure cylinder and can contain pigment up to about 25% pigment by volume, although less and 10% by volume is preferred. The dried coat weight of the size coat ranges from about 1 to 3 $gr/m^2$.

The size coat comprises any of various suitable coating compositions to provide adhesion of the decorative foil to the extruded sheet during the transfer step carried out later during the process. The size coat preferably comprises a suitable thermoplastic resinous material such as an acrylic resin. In one embodiment, the size coat comprises a polymethyl methacrylate or polyethyl methacrylatecontini resin. Such a size coat formulation is sufficient for providing a good bond to an extrusion made from a PVC resin.

In certain instances in which a backing sheet may be made from a thermoplastic olefin such as polypropylene or polyethylene, a different size coat can be used. In this instance, the size coat is preferably made from a coating composition of a solution of thermoplastic chlorinated polyolefin (CPO). A preferred CPO size coat preferably is a chlorinated polypropylene or chlorinated polyethylene, in which the coating composition contains about 10% to about 60% by weight of CPO, and corrpseondingly, about 50% to about 90% by weight solvent.

Following drying of the size coat, the foil exits the drying oven 258 and is passed through a tension control prior to ben wound on a supply roll 260. The completed foil is then removed from the second coating system and installed at the unwind station of the extruder-laminator shown in FIG. 18. The completed foil is illustrated in cross-section in FIG. 19.

Figure 18:
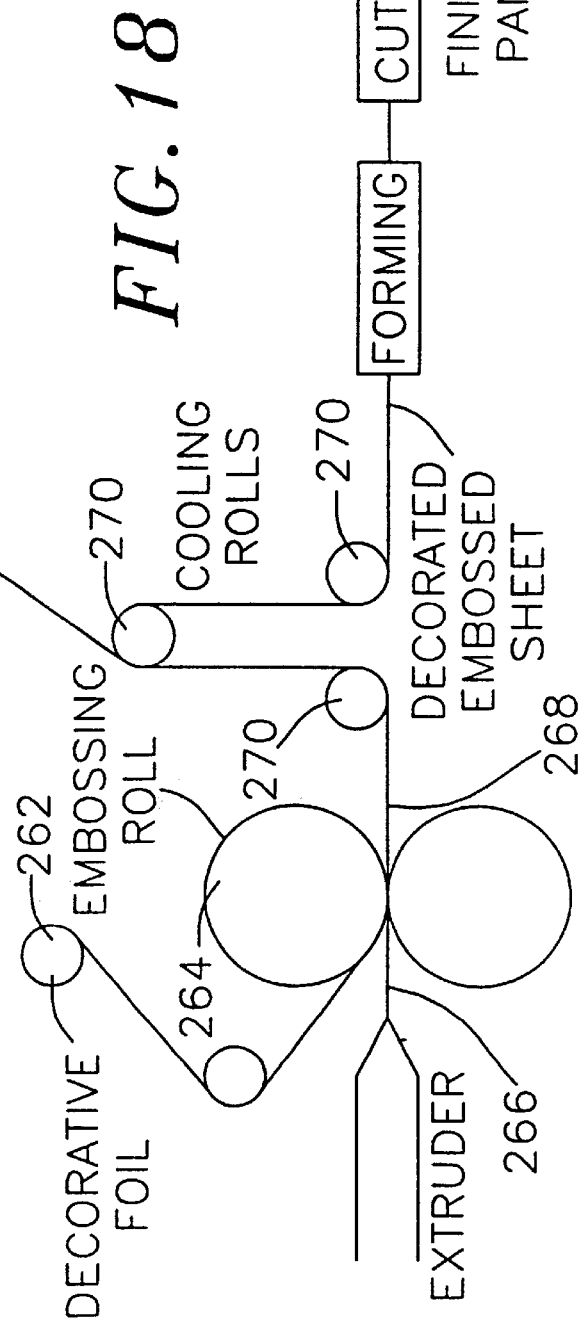
FIG. 18 is schematic diagram illustrating an in-line decorative transfer and embossing step in the process for making extruded plastic siding panels with embossed decorative wood grain surfaces.
Figure 19:
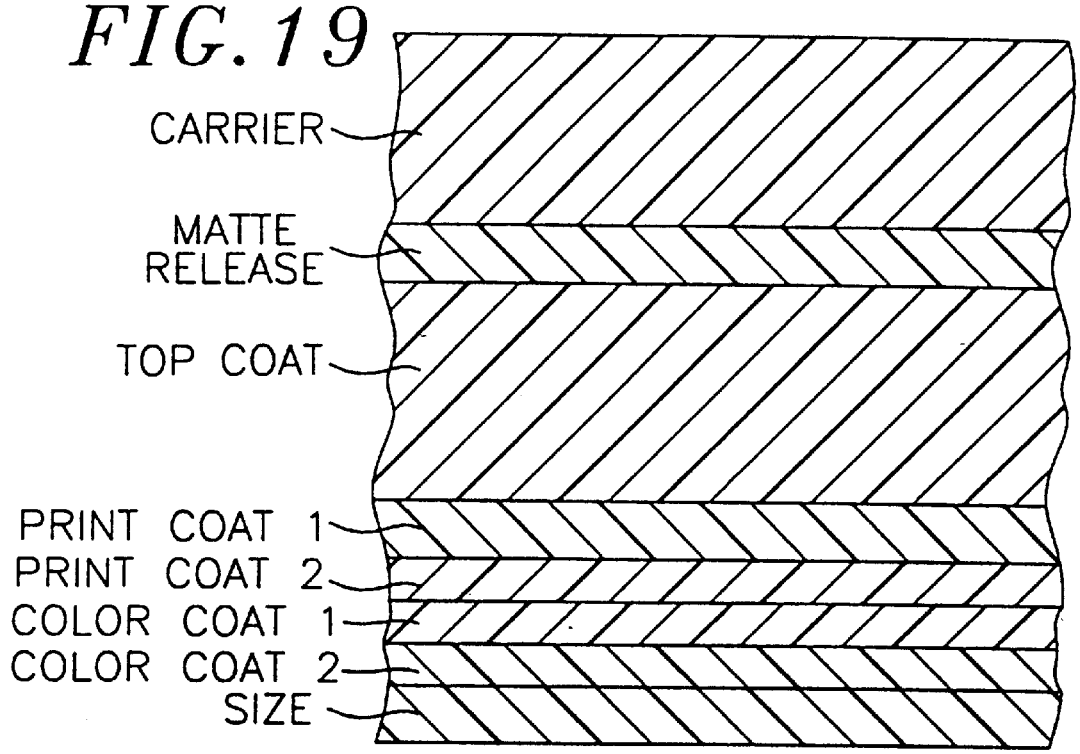
FIG. 19 is a schematic cross-sectional view illustrating components of one embodiment of a decorative wood grain foil.

Referring to FIG. 18, during the transfer embossing step, the wood grain prined transfer foil 262 is fed to the nip of an embossing roll 264 so that the carrier film is in pressure contact with the metal embossing roller and the size coat on the foil is in pressure contact with the extruded plastic film 266. The embossing roll 264 imprints a three-dimensional pattern of impressions in the outer surface of the topcoat. Embossing is optional since a panel may be made without embossments for producing an otherwise desired surface finish. Embossing it done through the depth of the carrier film. Since embossing is carried out when the extruded sheet is at a temperature below, but reasonably close to its extrusion die exit temperature, the extrusion is sufficiently pliable to facilitate embossing deep tree-dimensional impressions (up to an average depth of about 120 microns) through the carrier film and into the depth of the topcoat on the surface of the extruded sheet. The carrier film is sufficiently thin (about 0.48 to about 0.75 mil) to cause the metal embossing roller pattern to be physically transferred through the carrier film to the topcoat, while still maintaining a carrier film strength sufficient to be hot stripped from the embossed topcoat at a stripping station 267 downstream from the embossing station.

When the decorative foil is pressed into contact with the extroded sheet, the extrusion temperature is also sufficiently elevated to bond the foil to the extruded sheet. The polyester carrier sheet has a heat resistance well above the extrusion die exit temperature, so the carrier resists elongation or deformation during the transfer and embossing step.

Following the embossing and transfer step, the flexible, laminated embossed extruded film 268 undergoes controlled cooling from the nip of the embossing roll to the point where the carrier is stripped from the laminate. A series of water-cooled chill rollers 270 produce a controlled temperature reduction in the laminate. The laminate is cooled to a temperature in the range from about 295° F. to about 340° F. occurring at the point where the carrier film is stripped from the laminate. The preferred stripping temperature is about 310° F. Cooling to the lower temperature also sets the impressions embossed in the laminate. If the temperature stays too high, flowability of the lamiate can cause the impressions to smooth out. The temperature drop also enhances freely removing the carrier from the laminate.

The matte release coat, which has been crosslinked and permanently bonded to the carrier sheet, remains adhered to the carrier film during the stripping process. The matte release coat has a chemical matte outer surface with a microroughness which transfers a low gloss surface to the topcoat. The micro-roughness of the matte coat is replicated to traser a sufficiently low gloss to resemble the appearance of natural wood grain. However, other gloss levels also can be produced. The formulation of the matte release coat provides a combination of the desired low gloss surface, together with a smooth or free release of the carrier sheet from the replated low gloss surface al elevated stripping temperatures.

Figure 20:
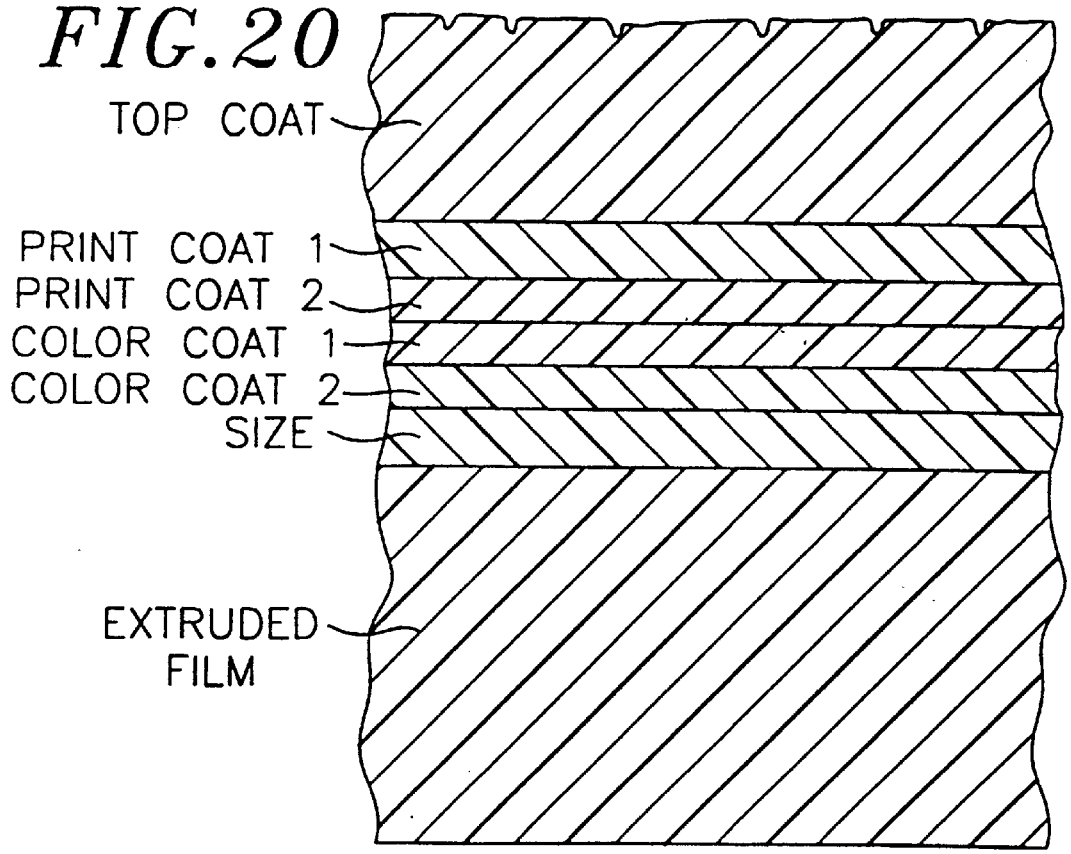
FIG. 20 is a schematic cross-sectional view illustrating components of a furnished plastic siding panel.

Following stripping of the carrier sheet, the decorated, embossed sheet passes from the cooling rolls to a forming station using forming dies to shape the edges of the sheet and punch mounting holes at desired intervals. Further cooling occurs between stripping of the carrier and the forming station. The formed sheet is then passed to cutting station for cutting the sheet into separate panels. A finished panel is illustrated schematically in FIG. 20.

One embodiment of this invention comprises a process for making solid color siding panels. FIG. 12 schematically illustrates initial steps in this embodiment of the invention in which a clear coat/color coat coextrusion is extrusion coated from the extrusion die 192 onto the thermoplastic substrate 184. The substrate in this embodiment is preferably a thermoplastic material 4 to 40 mils thick. The substrate can be an extruded rigid pigmented PVC compound with a thin coextruded acrylic tie layer extrusion as a coextrusion from the extruder die 176. The substrate polymer compound is preformed as an extrudable material in pellet or dry flowable powder form from the hopper into the extruder to the feed block and die. The coextrusion die is adjacent to the calendar stack of three temperature controlled rolls 178, 180 and 182.

The tie coat is preformed as an extrudable material in pellet form fed from the hopper into a second extruder to the same feed block or die as the substrate polymer. The coextrusion is typically fed horizontally into a set opening between the top and middle rolls of the three roll calendar stack. The top roll 178 is used for metering and the middle roll 180 is set at line speed to support the substrate while it starts to solidify. The bottom roll 182 is used to smooth the top surface of the tie coat and to finish cooling the substrate for proper handling.

The weatherable solid color PVC cap stock made as described above is preferably about six mils in thickness and is pigmented to supply a suitable background color to the weatherable extrusion coats extruded from the die 192.

The clear coat preferably comprises a solid polymeric material that can be extruded as a transparent film, and polyvinylidene fluoride (PVDF) and polyvinyl fluoride (PVF) are the preferred fluoropolymers. A presently preferred extrudable polymeric material for this application comprises a blend of PVDF and acrylic resins. The preferred acrylic resin is a polymethyl methacrylate polymer (PMMA), although a polyethyl methacrylate polymer (PEMA) also can be used. In a presently preferred formulation the clear coat material comprises approximately 50 to 75 percent by weight PVDF and from approximately 25 to 50 percent acrylic resin, by weight of the total resin solids present in the PVDF/acrylic formulation. These solids ranges are based on the relative proportions of the PVDF and acrylic components only in the clear coat formulation. Other minor amounts of solids such as UV stabilizers, pigments, and fillers also may be contained in the clear coat formulation.

The color coat may comprise the same resinous materials as the clear coat and to which pigments have added. The level of pigmentation in the color coat is typically 10 to 20 percent of total compound weight, but in some cases can be higher. Other minor amounts of solids such as UV stabilizers and fillers can be included. Mixed metal oxide pigments are the preferred pigments because of their excellent heat and light stability and the availability of an IR-reflective black pigment which s heat build-up in the wood grain decorated vinyl siding panel.

The color coat and clear coat are preformed as an extrudable material in pellet form fed from the hopper 186 to the extruder 187 and from the hopper 188 to the extruder 189, respectively. Extruded clear coat and extruded color coat. are individually fed into the feed block 190 and then the partitioned melt is extruded from the die 192 onto the surface of the extruded substrate where they form individual layers. The color coat is in contact with the tie layer on the substrate and the clear layer provides an exterior protective coat for the color coat. In one embodiment, line speed exceeds 200 feet per minute. The die 192 extrudes the polymeric material to form a thin coating of the two liquid layers that uniformly coats the tie coat surface of the substrate. The clear coat thickness can range from 0.1 mil to 2.0 mils and the color coat thickness can be 0.3 to 2.0 mils. The preferred thickness is 0.6 mil for the color coat and 0.4 mil for the clear coat. Extrusion temperature is in excess of 350° F., and in some instances can approach 475° F. The entire thickness of the coated substrate is cooled immediately while in contact with the chill roll 196. The extruded substrate is wound as the take-up roll 204. (In this instance, the high gloss carrier 200, referred to earlier in the process described in FIG. 12, is not used to control gloss.)

The rigid PVC substrate with the weatherable solid color finish is next installed at the unwind station 262 of the extruder-laminator shown in FIG. 18. Referring again to FIG. 18, during the lamination embossing step, the weatherable solid color substrate is fed into the nip of the embossing roll 264 so that the weatherable finish is in pressure contact with the metal embossing roll and the substrate contacts the molten PVC extrusion. The embossing roll imprints a three-dimensional pattern of impressions in the outer surface of the topcoat. Embossing is done in contact with the weatherable top cap and relies on heat from the molten PVC to supply the heat for embossing the impressions. If necessary, the weatherable finished substrate can be preheated with IR heaters or a heated roll to allow the weatherable solid color finished substrate to accept the imprint from the embossing roll. When exiting the embossing nip the substrate of the weatherable top cap is permanently fused to the extruded PVC material. In this embodiment no carrier sheet is used and the surface properties of the finished panel are controlled by the embossing process. After embossing, the weatherable solid color siding material proceeds to forming dies where the siding is formed by shaping the edges, the siding is chilled in a water bath, mounting holes are punched, and the siding panel is cut to the desired size. As an alternative, and as mentioned previously, the extrusion coated vinyl siding panels can be made without adding the embossments.

EXAMPLE 9

A matte release coat was formulated as follows:

| COMPONENT | PARTS |
|---|---|
| Composition 1 | |
| Methyl isobutyl ketone (MIBK) | 30.50 |
| Isopropyl alcohol | 5.40 |
| VAGH | 5.30 |
| ASP400P | 52.60 |
| Lankyd 13-1245 | 6.20 |
| Composition 2 | |
| Methyl isobutyl ketone (MIBK) | 56.70 |
| Isopropyl alcohol | 9.00 |
| VAGH | 15.10 |
| Lankyd 13-1245 | 19.20 |
| Release Coat | |
| Composition 1 | 39.99 |
| Composition 2 | 20.60 |
| SR107 | 2.09 |
| S381-N1 | 9.70 |
| MIBK IPOH blend (85/15) | 17.39 |
| Cycat 4040 | 4.07 |
| Cymel 303 | 6.16 |

The components of these formulations are described in more detail in U.S. Pat. No. 5,203,941, which is incorporated herein by reference.

Composition 1 was produced by dissolving the VAGH resin in an MIBK and IPOH blend by mixing with a Cowles mixer and then adding the Lankyd 13-1245 and ASP400P while mixing. This mixture was then sandmilled at a temperature of about 110° F. to disperse the ASP400P. The release coat was prepared by blending compositions 1 and 2 and then adding the remaining components in order while mixing at 1,000 rpm with a Cowles mixer. Care must be taken to avoid heating the release coat to greater than 90° F. to avoid swelling and/or partially dissolving the Shamrock 381-N1 wax. It is recommended that the catalyzed release coat be used within 24 hours at normal process conditions.

An extrusion PVDF/acrylic was compounded from the following components:

| COMPONENTS | PARTS |
|---|---|
| Extrusion Coating Kynar 720 | 68.4 |
| VS100 | 29.6 |
| Cyasorb 2098 | 2.0 |
| | 100.0 |

This extrusion coating formulation was compounded using the twin screw Werner Pfleiderer Model 53MM extruder to obtain pellets of uniform blend. The twin screws were co-rotating and its configuration was designated Avery Dennison "A." The two resins were dried in a dryer at 160° F. for four hours before being extruded into pellets. During th extrusion process the vacuum vent in the compression zone of the screw was used to further remove moisture and other volatile components. The feed into the extruder was starved, and the, heating elements or zones of extruder were set at (1) 100° F., (2) 360° F, (3) 360° F., (4) 360° F. (5) 360° F. (6) 360° F. (7) 360° F. but the observed values were (1) 108° F., (2) 360° F., (3) 374° F, (4) 366° F., (5) 360° F., (6) 355° F., (7) 358° F. The screw was maintained rpm using 680 H.P. and a corresponding current of 52–54 amps. The melt temperature of this formulation was maintained at 355° F. and a screen pack consisting of three different wire meshes: 20, 40 and 60 was used to clean the melt stream. This material was pelletized.

A clear ink and color coat vehicle was prepared from the following formulation:

| PRINT PROCESS | COMPONENTS | PARTS |
|---|---|---|
| Ink vehicle | Methylethyl ketone | 41.54 |
| | Methylpropyl ketone | 41.53 |
| | Kynar 7201 (SL) | 12.45 |
| | Elvacite 2010 | 4.15 |
| | Tinuvin 234 | 0.33 |
| Grain ink 1 | Ink vehicle | 81.70 |
| | Buff MMO pigment concentrate | 0.10 |
| | Brown MMO pigment concentrate | 11.70 |
| | Black MMO pigment concentrate | 3.30 |
| | Solvent blend 65% MEK 35% MPK | 3.20 |
| Grain ink 2 | Ink vehicle | 76.80 |
| | Buff MMO pigment concentrate | 0.60 |
| | Brown MMO pigment concentrate | 14.40 |
| | Black MMO pigment concentrate | 5.00 |
| | Solvent blend 65% MEK 35% MPK | 3.20 |
| Color coats | Ink vehicle | 59.60 |
| | White TiO$_2$ pigment concentrate | 23.60 |
| | Buff MMO Pigment Concentrate | 4.10 |
| | Brown MMO Pigment Concentrate | 7.80 |
| | Black MMO Pigment Concentrate | 0.60 |
| | Solvent blend 65% MEK 35% MPK | 4.30 |
| Size coat | Toluene | 59.40 |
| | IPOH | 19.80 |
| | Elvacite 2010 | 19.44 |
| | Degussa TS-100 | 0.97 |
| | Tinuvin 234 | 0.39 |

The ink vehicle was made by dissolving the Kynar 7201, Elvacite 2010, and Tinuvin 234 in MEK and MPK, and heating to 130° F. to completely dissolve the Elvacite 2010. The grain inks and color coats were prepared by blending components in the above ratios adjusted to match the color standard. The size coat was prepared by dissolving the Elvacite 2010 in the toluene and IPOH at 130° F. while mixing in the Degussa TS-100.

Preparation of the Wood Grain Printed Transfer Foil

The matte release coat was gravure coated with a 100HK gravure cylinder pattern at a coat weight (dried) of 5.0 gr/m$^2$ onto a 60 gauge oriented gloss polyester carrier sheet, using the processing steps illustrated in FIG. 2. The carrier comprised Skyrol SM30, sold by SKC America, Inc., traveling at 200 feet per minute. The release coat was dried and crosslinked in a 20 foot impinging-air oven (Oven 1) at an air temperature of 340° F. The release coated carrier was then cooled and wound as a roll. In a preferred configuration (FIG. 2) the release coat and extrusion clear coat are applied in tandem.

The release coated carrier sheet was provided as a supply roll and was unwound at a high speed through an extrusion coating station. As the carrier sheet moved at a high rate of speed, compounded pellets of PVDF/acrylic enter an extruder through hopper. In the extruder, external heaters and mechanical energy from the rotating screw heated the compound to above its melt temperature and forced it through the slot die as a flow of the polymeric material at 420° F. The extrudate flows downward and contacts the release coated carrier sheet and a Teflon® coated cooling drum at the nip point between the rubber backup roll and the Teflon® coated cooling drum. As the extrudate approaches the nip point, the high line speed accelerates the flow of the extrudate and draws it into a 0.4 mil thick film while, with high nip pressure of about 200 pounds per linear inch and the molten properties of the polymer, the film replicates the surface of the matte release coat. Cooling water at 70° F. chills the clear coat and removes the excess heat from the process. The release coated PET with extruded clear coat is then removed from the surface of the Teflon® coated drum and wound on a rewind.

The rewound roll is removed from the second coater and set up on the unwind station a third coater (FIG. 17). The clear coated side of the coated film was then gravure print at a speed of 200 feet per minute with a series of two grain prints, two color coats, and a size coat. The drying oven temperatures were 250° F. The grain inks and color coats (formulations described above) were made by pigmenting the Kynar 7201/Elvacite 2010 clear vehicle above with pigment concentrates made with mixed metal oxide (MMO) pigments. These mixed metal oxide pigment concentrates were supplied by Gibraltar Chemical Works, South Holland, Ill.

The use of mixed metal oxide pigments in the wood grain print inks and. color coats is desirable because of the excellent durability of mixed metal oxides and the availability of an infrared-reflective mixed metal black pigment which minimizes heat build-up in the wood grain decorated vinyl siding panel. However, the mixed metal oxide pigments can result in excessive gravure cylinder wear when the grain ink patterns are coated with chrome finished gravure cylinders. To avoid this problem the etched cylinders were coated with a metal nitride such as a titanium nitride ceramic coating. The cylinders are coated with a conventional vacuum metallization process.

The color coats serve not only as a background color for the wood grain pattern but are used to block natural light from attacking the vinyl in the siding panels. The combination of a clear coat over a durable mixed metal pigments system with UV blocking in the PVDF/acrylic foil serves to eliminate chalking, minimize fading and protect the PVC from the harmful effects of weathering.

Production of Experimental Painted Wood-Like Vinyl Siding

A coextruded PVC siding construction was extruded at a temperature of about 400° F. at a speed of 60 ft/min and a total thickness of about 44 mils. The top coextrusion layer, also known as the weatherable top cap, was placed over a lower-cost substrate which contained regrinds. The top cap contained higher pigmentation and higher stabilizer content to improve the performance of the siding material. The lower pigmentation, lower stabilizer, higher filer, and regrind in the bottom layer combined to lower the cost of the siding material. The crossweb width was approximately 15 inches. The vinyl sheet contained pigments to provide the background color of the vinyl siding panel. The previously produced wood grain printed transfer foil was passed through the nip of an embossing station along with the extruded film. Embossing was from a 12.5 inch diameter metal embossing roller. The embossing station was positioned approximately five inches from the extruder die exit opening. The polyester carrier sheet race was in contact with the metal embossing roller, and the size coat was in contact with the extruded film.

The embossing roll imprinted a three-dimensional pattern in the transfer-decorated film which simulated wood gain in the form of painted wood with random lines generally in one direction of various lengths, widths and depths spaced apart about 1 to 2 mm with an average peak-to-valley height of about 20 to 120 microns. There were some deeper embossed lines. When viewed in oblique light, the embossing cast shadows similar to those found with natural painted wood viewed at the same angle.

The extruded sheet was cooled to a temperature of about 308° F. before stripping the carrier film from the decorated vinyl sheet at a supping station downstream from the transfer and embossing station. The carrier film had a sufficient thickness (60 gauge or 0.60 mil) to allow the metal embossing roller pattern to be transferred, while maintaining the film strength to be hot striped from the clear coat at a temperature of 308° F. The release-coated carrier sheet was wound for removal, and the clear-coated, wood grain decorated embossed extruded vinyl material proceeded to forming dies where the siding was formed by shaping the edges, punching mounting holes, and then cutting to size.

Vinyl siding produced by this process in this release coat had 75 degree gloss readings of 18–20 gloss units, giving the appearance of natural painted or stained wood. Surface gloss was measured by ASTM test D 3679-86, 5.11.

EXAMPLE 10

FIG. 2 schematically illustrates the first step in a process in which the color coat is coextruded, along with an acrylic size coat, onto the release coat described in Example 8. The color coat is extruded on the release coat surface of 0.6 mil polyester film with the size coat contacting the Teflonx® coated cooling roll. The color coat thickness can be 0.5 to 2.0 mils, but in a preferred embodiment the color coat is a 1.0 mil thick film weighing 45 gm/m$^2$. The color coat is designed to block 100 percent of UV radiation. After cooling the foil is wound on a take-up roll.

The color coat with size formulation as described above is next placed on the unwind stand of the extruder-laminator shown in FIG. 18. During the transfer embossing step, the solid color transfer foil is fed to the nip of the embossing roller where the size coat on the foil is in pressure contact with the molten extruded plastic film. The embossing roll imprints a three dimensional pattern of impressions in the outer surface of the color coat. Embossing is done through the depth of the carrier film. Since embossing is carried out when the extruded sheet is at a temperature below, but reasonably close to its extrusion die exit temperature, the extrusion is sufficiently pliable to facilitate embossing deep three dimensional impressions (up to an average depth of about 120 microns) through the carrier film and into the depth of the topcoat on the surface of the extruded sheet. The carrier film acts as a thermal barrier and is sufficiently thin (about 0.48–0.75 mil) to cause the metal embossing roller pattern to be physically transferred through the carrier film to the topcoat. The carrier still maintains a carrier film strength sufficient to be hot stripped from the embossed topcoat at the stripping station downstream from the embossing station.

The preferred plastic extruded in the extrusion laminator is a typical coextruded PVC substrate material used to make vinyl siding panels. A low cost substrate material has the following formulation:

| COEXTRUDED SUBSTRATE FORMULATION | |
| --- | --- |
| MATERIAL | PARTS/HUNDRED RESIN |
| PVC resin | 100.0 |
| Total pigment | 3.0 |
| Impact modifier | 5.0 |
| Heat stabilizer | 1.2 |
| Process aids | 0.5 |
| Calcium stearate | 1.2 |
| Calcium carbonate | 10.0 |
| | 120.9 |

This material does not have sufficient pigmentation by itself to make siding panels, but the finished combination is sufficient because the solid color laminated film (described above) has sufficient pigmentation to block all UV radiation and to provide require opacity. This compound can be dry blended and fed into the extruder hopper as a dry powder.

The process illustrated in FIG. 16 depicts a further embodiment of the invention comprising a four layer coextrusion of a clear coat, a color coat, a size coat and a backing sheet and the subsequent lamination of a high gloss polyester film to the clear coat portion of the laminate. A flat sheet extrusion line is equipped with four extruders. One extruder is fed backing sheet material such as ABS, polycarbonate, TPO, or PETG. A second extruder is fed size coat materials such as PMMA, PEMA, or CPO. The size coat material is selected to bond the PVDF/acrylic color coat to the balding sheet. A third extruder is fed a PVDF/acrylic color coat, and the fourth extruder is fed a PVDF/acrylic clear coat. The melt from these extruders is fed into a feed block which controls the relative thickness of each component in the final coextruded laminate structure. A preferred ratio is: 19,1,1,1. The partitioned melt flows to the die where it is extruded. The coextruded laminate structure is then fed horizontally into a set opening between the top and middle rolls of a three roll calendar stack where a high gloss polyester carrier is laminated to the clear coat portion of the laminate. This laminate, along with the PET carrier is then "S" wrapped around the lower two rolls of the three roll stack for cooling and then traveled over idler rolls to a take-up roll.

EXAMPLE 11

Figure 21:
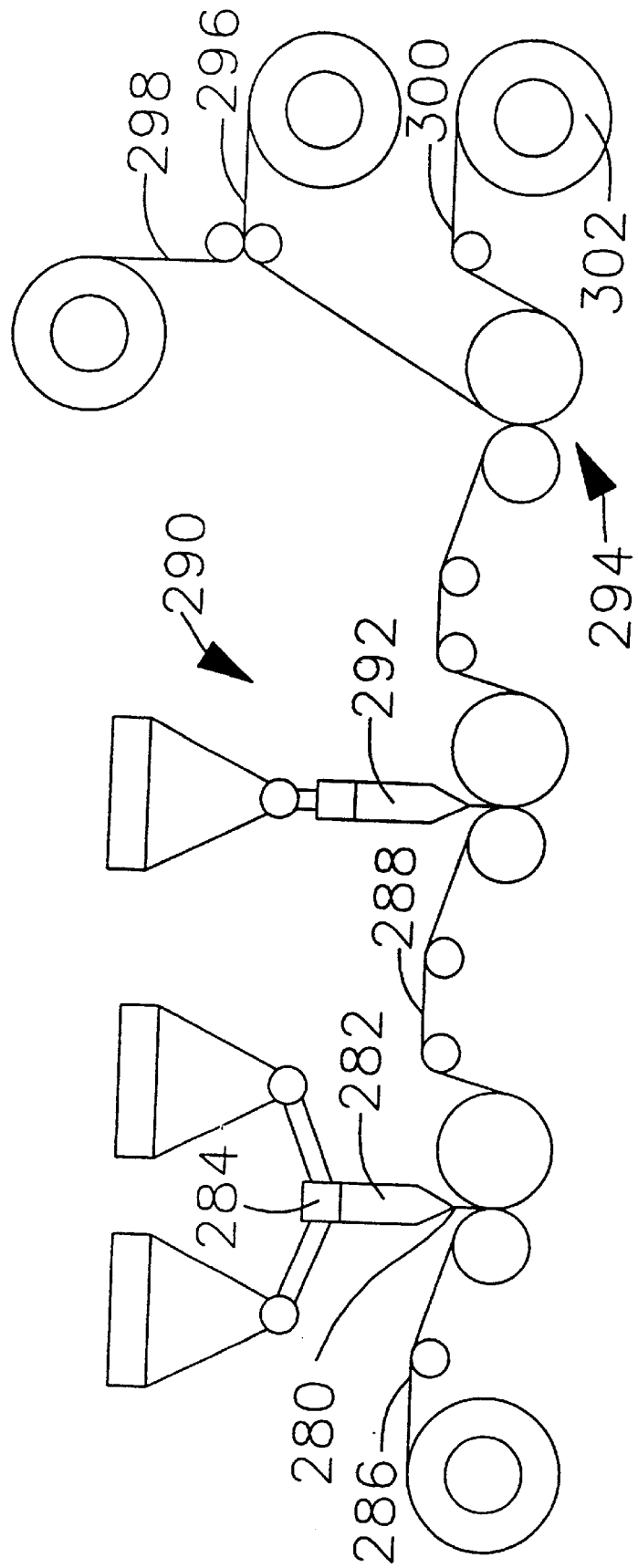
FIG. 21 is a schematic diagram illustrating an embodiment of the invention in which a carrier sheet is extrusion coated with a clear coat followed by an extrusion coating of a color coat, an optional extrusion coating of a PVC color coat, and transfer of a pressure sensitive adhesive.

The formulation of Example 4 was coextruded with other polymeric materials as illustrated in FIG. 21. A coextrusion melt 280 comprising a clear coat and a primer coat is extrusion coated onto a 2 mil high gloss polyester sheet, such as Hostaphan 2000 from American Hoechst. This process used an extrusion coating station equipped with two extruders. One extruder is fed a clear coat material as described in Example 3. The second extruder is fed a primer coat; this primer acts as a tie between sheet PVDF/acrylic clear coat and the color coat. The melt stream from both extruders is fed into a feed block; the partitioned melt then flowed to a die 282. This melt is extrusion coated onto the polyester sheet such that the clear coat is in contact with PET. The polymeric materials contained in the primer consist primarily of acrylic and/or vinyl resins. The preferred acrylic resin is polyethyl methacrylate (PEMA). Other minor amounts of solids, such as UV stabilizers, pigments, and fillers may also be present in the prime coat formulation. The prime coat is applied to the clear coat side of the web 286, and is used to enhance the chemical bond with the color coat.

After the prime coat is applied, the coated carrier sheet 288 passes to another extrusion coating operation 290 where an extrusion coated color coat is applied from an extruder die 292 to the prime coat side of the web. This color coat can comprise various resins, including PVDF, acrylic, PVC, and urethane, plus other additives and fillers, including pigments, heat stabilizers, and light stabilizers.

The web then passes to a laminating station 294, where a pressre sensitive transfer tape 296 is applied to the color coat side of the web. The laminating station includes the heated drum and pressre roll described previously. The transfer tape had been previously coated using conventional reverse roll coating techniques, and is protected by a release coated carrier sheet 298. The extrusion coated and adhesive coated carrier film 300 is then wound as a take-up roll 302.

This construction was used in an exterior automotive application where pure sensitive films are typically used, and retained high gloss and DOI.

Thus, the invention has been described in relation to its uses in the manufacture of exterior automotive body panels and extruded plastic siding panels, although other uses are contemplated, such as window and door moldings, rain gutters and other outdoor structures, for example.

EXAMPLE 12

Two trials were conducted in which substrates were coextruded with a size layer for laminating to exterior dry paint films.

In one trial a one mil urethane modified polyethylene adhesive layer (MOE 2, Elf Atochem) was coextruded with a one mil modified polyethylene tie layer (Admere SF-700, Mitsui), both of which were coextruded with an 18 mil TPO backing sheet (a polypropylene Dexflex, DNS Plastics International). In another trial a one mil urethane modified polyethylene adhesive layer (MOE 2) was coextruded with a one mil modified polyethylene tie layer (Admere SF-700), both of which were cotextruded with an 18 mil polypropylene (homopolymer) backing sheet. The three-layer coextrusions were successful in laminating to dry paint films with good adhesion. The coextrusions were each laminated to: (1) a one mil high gloss PVDF/acrylic clear coat/0.5 mil black PVDF/acrylic color coat paint film having a 0.1 mil PMMA size coat; (2) a high gloss PVDF/acrylic clear coat (one mil)/color coat (0.5 mil red) paint film having a 0.1 mil PMMA size coat; and (3) a one mil PVDF/acrylic monocoat mid-gloss black paint film with no size coat.

The urethane modified polyethylene adhesive layer provided good adhesion to the PVDF/acrylic dry paint transfer films and the modified polyethylene tie coat provided good adhesion to the olefin backing sheets. The coextrusions were successful in that their melt temperatures were reasonably close to each other, within a range of about 50° F.

Compounding of Resins

Compounding of the resin can be a critical aspect of the extrusion process. A preferred formulation for the staring material used in extruded film trials described below comprises a 60/40 blend of PVDF and PMMA along with a UV stabilizer comprising about 2% of the total blend. Other formations can be used, as described below. In addition, the extrusion techniques described herein are generally applicable to clear coat films extruded at a film thickness of about 0.5 to about 2 mils, and for the trials described below, coat thickness was about one mil.

A suitable extruded film, particularly for exterior automotive use, requires minimal optical defects in order to ensure reasonably high optical clarity in the finished clear coat outer film. Optical defects in the extruded film can be caused by dirt particles and other entrained commants from the extruder and/or by formation of gels in the extruded material. For instance, extruded coatings containing PVDF polymers are subjected to gel formation at high extrusion temperatures. Crosslink of vinylidene fluoride polymers increases at high melt temperatures, leading to a greater number of defects caused by gel formation. One of the objectives of the invention is to maintain high liMe speed while producing extruded films with minimal defects. However, there is a relationship between line speed and the number of defects for a given extruder. If extruder screw rpm must increase to produce higher line speeds, more shear and heat generation in the extruded material may cause gel formation and resultant optical defects.

Variations in processing can reduce the formation of defects caused by gel formation in the extruded clear film. As mentioned, gel formation from the PVDF component is a main contributor to defects, and one approach is to remove one "heat history" from the melt by a two-step melt extrusion process in which the PVDF is subjected to less heat. The two-step process involves: heat history 1—making pellets from the acrylic material and UV stabilizer, in the absence of PVDF, followed by heat history 2—making the extruded film in which the PVDF is dry-blended with the pellets made in the first processing step. This avoids the one "heat history" of subjecting the PVDF to heat in producing pellets from the PVDF along with the acrylic and UV stabilizer. Tests have shown that films with too high a level of defects were made by melt blending the PVDF, acrylic and UV stabilizer together to make pellets because of the high shear required to properly blend the components.

In one experimental test for making an extruded film, a twin-screw extruder was used. Twin-screw extruders can have an advantage over single-screw extruders because they can mix the materials at low shear, which minimizes temperature rise during compounding. This extrusion trial involved pellets made by removing the one "heat history" of the PVDF from the compounded material. The UV stabilizer Tinuvin 234 (Ciba Geigy) in powder form was distributed in an acrylic component comprising VS-100 (Rohm 4and Haas) PMMA in pellet form. These materials were extruded in a first pass through the extruder to form pellets while avoiding exposing the PVDF to one extrusion pass. A high extrusion temperature above the gel temperature of the PVDF (in order to properly blend the acrylic and UV stabilizer) can be used in the first pass because of the absence of the PVDF. In one trial this temperature was 460° F. An extrusion-grade PVDF (Kynar 720) was added in pellet form to the second extrusion pass in which an extruded clear film having low gels and defects was produced when extruded at 400° F. In one trial in which a one mil thick clear coat film was extruded onto a PET carrier, defects were observed to drop fourfold (from a 50 to 60 gel count to a 10 to 15 gel count) when compared with a trial involving initially making the PVDF in pellet form and extruding all three components together, followed by extruding the resultant material into a film.

As an alternative to a twin-screw extruder, a single-screw extruder was designed which permitted extrusion of the film at lower shear and a lower melt temperature. The extruder flights were designed to increase output and reduce melt temperatures. A low-corrosion Chromalloy material was used for the screw extruder. The extruder comprised a 2½-inch Black Clawson single-screw extruder at 30:1 L/D. The extruder flights were reduced and the tolerance between the extruder and the inside of the extruder barrel was increased slightly, both of which reduced the abrasion that causes shear and temperature build-up during extrusion. Clear films one mil in thickness were produced on a PET carrier with greatly reduced gels and defects. In one trial, considered the most successful to date for this extruder, extruder screw speed was 68 rpm, extrusion melt temperature was about 400–410° F. at the extruder die opening, barrel temperature of the extruder was about 370–380° F., melt pressure was about 2,800 psi, and the chill roll was operated at 75° F. Line speed was 135 ft/min at a web width of 51 inches. A defect count in the range of 3–15 was produced, based on a C-charting test method described below. It was observed generally that the exuded film clears up at reduced extruder rpm. Raising the chill roll temperature to 85° F. also appeared to improve film clarity in one trial.

Another approach in reducing defects in the extruded film is with a powder-to-film briquetting process. In the original process of making PVDF, the product is in powder form which comes directly from the reactor when the PVDF is polymerized. In order to attain the objective of producing prills, or briquettes, with minimal heat, the prills can be produced in a single-step process from the original powder form of PVDF, PMMA and the UV stabilizer. A dry extruder with large compaction rolls applies pressure to the powder-form materials to produce compaction into prills without melting.

In one test, 86.4% powder-form PVDF, 10% PMMA and 3.6% Tinuvin 234 was compacted into prills. The prills were then extruded with PMMA to adjust the final blend ratio to the preferred 60/40 ratio, and the resulting extrusion formed a clear film having low defect levels. The powder-form materials are subjected only to pressure with minimal heat to compact them into the briquettes. In one trial, material was compacted at 2,400 psi with a temperature rise of about 130° F. This process avoids subjecting the PVDF to shear and high temperature normally involved in malding pellets.

In another approach for making extruded clear films with minimal defects, a PVDF/acrylic extruded film was made from a large single-screw extruder. This extruder was designed to provide a short minimal distance between the extruder outlet and the die inlet opening so as to minimize melt travel. A screen pack using 20/40/60/80/100 mesh screens was placed between the extruder outlet and the die inlet opening. In one embodiment, the distance between the extruder outlet through the screen pack to the die inlet opening was less than about two feet. This large six-inch-diameter single-screw extruder was operated at a low rpm which in one trial was 24 rpm. Because of its low speed and reduced wall contact with the extruded material over the short distance of travel, the polymer melt experienced low shear. Temperature of the extruded material was also low, about 400° F., well below the 450° F. gel temperature of the PVDF component. Preferred operation of the extruder maintains maximum inter exudate temperatures to below about 20°–30° F. below the 450° F. gel temperature of the PVDF. The exuder produced a clear film extruded at one mil thickness, 51 inches in width, onto a traveling PET carrier. The resulting extruded clear coat film was essentially defect-free. Lie speed also was approximately 160–170 ft/min. The low defect level was attributed to the large-volume, low-shear operation of the extruder. A similar trial unm conducted with the 2½-inch single-screw extruder (described previously) operating at the same line speed produced a film with greater defects because of higher temperature and shear. Generally speaking, because of the reduced volume of the 2½-inch single-screw extruder, line speed would be reduced if shear and temperature are reduced to produce fewer defects.

The number of visual defects in a finished extruded film is measured to determine the optical quality of the film. This test procedure, referred to as C-charting, involves determining a standard definition for what a defect comprises, by determining the maximum size of gels, fisheycs or other optical defects which can be tolerated without adversely affecting acceptable film clarity. A second Charting standard sets the maximum number of defects acceptable for a given surface area of the finished extruded film. The defect count can be charted by plotting the number of defects in a given area at selected time intervals as the extruded material is being produced. The charting can reveal undesired shifts, trns, cycles or patterns in the extrusion process.

In one test standard, the film is viewed on a flat surface with a predetermined light source, and the film is visually inspected for defects. Any non-uniformity (or non-conformity) larger in diameter than 0.8 mm is considered a defect, and the number of defects per eight square feet of extruded film are counted, although this standard area can vary. An acceptable film can be determined to comprise a film having an average defect per area count below a preset value, which in one test standard is five defects or less per eight square feet of surface area. This sample area is determined as a result of conventional film extrusions 48 inches wide, with test samples taken at two feet intervals. (In the extrusion trials described previously in which film width was 51 inches, defects were counted for 8½ square feet areas.)

EXAMPLE 13

The material used for this trial comprised Kynar 720 PVDF/VS-100 PMMA/Tinuvin 234 UV stabilizer in a 60:40:[2 pph] blend. The process described above for making PVDF/acrylic pellets with minimal exposure to heat was used to prepare the starting material. The extruder comprised an Egan six-inch single screw, single flight extruder. The distance between the extruder outlet and the extruder exit opening was less than about two feet, and a screen pack using 20/40/60/80/100 mesh screens was interposed between the extruder outlet and the die inlet opening. An extruded clear film coating approximately one mil in thickness was extruded at a web width of 51 inches onto a traveling PET carrier film. Initial start-up was begun utilizing the Kynar/acrylic blend. The extrusion profile was 450° F. to facilitate screw coating at low amps. Once the polymer flow was established, the barrel temperatures were reduced and the coari process was begun on a poly-coated paper substrate to assist in gauge setup. After gauging was sufficient, the PET substrate was begun. The extruder was operated at a low rpm to prepare a total of 13,000 feet of film. Several trials were conducted. In one set of trials, extruder rotation was 24 rpm in order to produce the greatest line speed of 157 ft/min. Other trials were conducted at 19 rpm to produce a line speed of 126 ft/min and at 15 rpm to produce a line speed of 100 ft/min. Melt pressure of the extruded material varied from 830 psi for the 24 rpm operation to 730 psi for the 15 rpm operation. The chill roll temperature was maintained at 75° F. in all trials. Extruder die zone temperature varied from about 40020 to 430° F. during the trials and barrel zone temperature varied from about 350° to 375° F. In all trials that were conducted, essentially zero defects were produced in the extruded films, resulting in a film having excellent optical clarity with the requisite quality attributes for exterior automotive use.

The PVDF/acrylic formulation ratio can affect film clarity. In general, the preferred PVDF-to-acrylic ratio is from about 55% to about 65%, by weight PVDF and from about 35% to about 45% acrylic, by weight of the total PVDF/acrylic solid polymers contained in the formulation. In a more preferred embodiment, films with the good clarity are produced with a PVDF-to-acrylic ratio of 57–61 % PVDF and 39–43 % acrylic.

Thus, optical defects caused by gel formation can be reduced to an essentially zero-defect state by reducing the level of heat and shear to which the extruded material is exposed both during preparation of the starting material that goes into the extruder and during extrusion to produce the finished film. Such gel formation is controlled to within acceptable limits by controlling stating material preparation and film extrusion so that heat and shear do not cause the material to be exposed to temperatures at or above the gel formation temperate of any of the polymers contained in the processed material. By operating all such steps in the process so that temperatures within the processed material stay at no more than about 20–30° F. below the gel formation temperature, an essentially zero-defect extruded clear film can be produced. The resulting film is thermoplastic and thermoformable into high gloss and DOI films suitable for exterior automotive use.

In addition to producing extruded films of such high optical clarity, there is a need to produce the films at reasonably high line speeds. As mentioned, increasing extruder rpm can increase line speed, but increased extruder rpm can produce more shear and heat, leading to more gel formation. To meet the objective of producing films at line speeds in excess of 100 ft/min, a large volume extruder operating at an extruder rotational rate of less than 50 rpm and producing an extruded film with a die exit opening temperature of about 20–30° F. below gel formation temperature can produce essentially defect-free extruded clear films. Melt pressure also is an important consideration and an extruder melt pressure of below about 2,000 psi is preferable, more preferably below 1,000 psi, and most preferably below about 700–800 psi. For the PVDF/acrylic extruded films to produce exterior weatherable automotive paint films of acceptable optical quality, the extruder has been shown to produce line speeds above 160 ft/min by operating a sufficiently large volume extruder at below about 50 rpm, and more preferably below 30 rpm, while maintaining extrusion temperatures of the film extruded from the die exit opening to about 30–50° F. below the gel formation temperature of 450° F.

EXAMPLE 14

The high optical clarity PVDF/acrylic extruded clear film of this invention also can be used as a weatherable protective outer coating for windows. In one process the clear film is exuded onto the PET carrier as described above. The PET carrier and clear film are then transfer-laminated to a laminate comprised of an outer adhesive coat and a metallized layer on a polyester film. The extruded clear coat layer is transfer-laminated to the adhesive layer and the PET carrier is removed to produce a composite comprised of the clear outer film/adhesive/metalliae layer/PET film. This composite is then laminated to a layer of glass with an intervening transient adhesive layer. The clear film provides good optical clarity and weatherability for the window gloss composite.

What is claimed is:

1. In a process for making plastic panels having an embossed low gloss decorative coating transfer-laminated to an extruded plastic sheet in which the decorative coating includes a protective outer layer made from a blended fluoropolymer and acrylic resinous material which provides the low gloss surface characteristics of the finished panel, the improvement comprising:

providing a matte release layer on a flexible, heat resistant polymeric carrier sheet in which the matte release layer contains a resinous material hardened at an elevated temperature to form a continuous heat resistant resinous film permanently bonded to the carrier sheet and having a micro-roughness on the release coated outer surface thereof;

continuously passing the carrier sheet in close proximity to an extrusion die of an extruder containing an extrudable material comprising a blended fluoropolymer and acrylic resinous material, and extrusion coating the resinous material from said extruder die to form a solid weatherable thermoplastic and thermoformable polymeric decorative coating as a continuous film on the micro-roughened release coated outer surface of the carrier sheet to thereby form a thin flexible transfer laminate, in which the starting material for the extrusion step is made by first blending an acrylic resin component with a UV stabilizer material in a first extrusion step followed by blending a fluoropolymer material with the extruded acrylic/UV stabilizer material in a second step;

immediately passing the decorative coating of the transfer laminate into continuous pressure contact with a cooling surface while the decorative coating is supported by the carrier sheet for cooling the decorative coating to harden it on the carrier-supported matte release layer;

extruding a plastic sheet at an elevated temperature through an extruder die opening, the extruded sheet having a heat of extrusion adjacent the extruder die opening;

overlaying the transfer laminate on the extruded sheet with the decorative coating thereof facing toward the extruded sheet;

applying pressure to the transfer laminate and to the extruded sheet from an embossing roll on the side of the transfer laminate opposite from the extruded sheet, and embossing directly through the matte release coated carrier sheet and toward the extruded sheet while the temperature of the extruded sheet is maintained near its heat of extrusion for thereby transferring heat to the decorative coating while the matte release layer remains in its heat resistant condition under the heat of extrusion to provide a continuous heat transfer barrier between the carrier sheet and the extruded sheet to thereby continuously transfer the decorative coating from the carrier-supported matte release layer and bond the decorative coating to the extruded sheet under the applied pressure, the transferred decorative coating being maintained in a pliable condition under the heat transfer thereto while the micro-roughness of the hardened matte release layer transfers a low gloss outer surface to the decorative coating, the embossing roll continuously embossing three dimensional impressions through the matte release coated carrier sheet and into the outer surface of the pliable decorative coating; and thereafter releasing the carrier sheet and its matte release layer from the embossed low gloss decorative coating after the embossed impressions have set permanently through a temperature reduction to thereby form a panel having said embossed low gloss surface.

2. The process according to claim 1 in which the surface gloss transferred to the decorative coating has a 75° gloss level of less than about 20 gloss units.

3. The process according to claim 1 in which the decorative coating comprises an optically clear transparent first layer in contact with the matte release layer and a pigmented second layer in thin film form bonded to the first layer, and in which at least the first layer is extrusion coated onto the matte release layer.

4. The process according to claim 3 in which the pigmented second layer also is extrusion coated onto the extruded first layer.

5. The process according to claim 3 in which the first layer and second layer are coextruded onto the matte release layer.

6. The process according to claim 1 in which the plastic sheet is extruded as a coextrusion of a supportive thermoformable polymeric sheet and a primer layer, and in which the transfer laminate is adhered to the primer side of the coextrusion.

7. In a process for making plastic panels having a low gloss decorative coating transfer-laminated to an extruded plastic sheet in which the decorative coating includes a protective outer layer made from a blended fluoropolymer and acrylic resinous material which provides the low gloss surface characteristics of the finished panel, the improvement comprising:

extruding a plastic sheet;

providing a flexible, heat resistant polymeric carrier sheet having a matte release layer bonded to it;

continuously passing the carrier sheet in close proximity to an extrusion die of an extruder containing an extrudable material comprising a blended fluoropolymer and acrylic resinous material, and extrusion coating said resinous material from said extruder die to form a solid weatherable thermoplastic and thermoformable polymeric decorative coating as a continuous film on the matte release layer of the carrier sheet to thereby form a transfer laminate, in which the starting material for the extrusion step is made by first blending an acrylic resin component with a UV stabilizer material in a first extrusion step followed by blending a fluoropolymer material with the extruded acrylic/UV stabilizer material in a second step;

immediately passing the decorative coating of the transfer laminate into continuous pressure contact with a cooling surface while the decorative coating is supported by the carrier sheet for cooling the decorative coating to harden it on the carrier-supported matte release layer;

applying pressure to the transfer laminate and to the extruded plastic sheet when the temperature of the extruded sheet is sufficient to transfer the decorative coating from the carrier supported matte release layer and bond the decorative coating to the extruded sheet; and releasing the carrier sheet and its matte release layer from the decorative coating transferred to the extruded plastic sheet, said matte release layer comprising a synthetic resinous coating dried to a film thickness and containing therein (1) a thermosetting synthetic resinous material bonding the matte release coat to the carrier, (2) a fine particulate filler dispersed in the resin so that, in dry film form, the filler contained in the resin produces a surface with a micro-roughness sufficient to transfer a low surface gloss to the outer surface of the transferred decorative coating, and (3) a wax component and a silicone resin component for enhancing release of the matte release layer from the embossed low gloss surface of the decorative coating.

8. The process according to claim 7 in which the surface gloss level transferred to the decorative coating has a 75° gloss level of less than about 20 gloss units.

9. The process according to claim 8 in which the matte release layer further comprises a silicone resin component in the synthetic resinous coating for further enhancing release properties.

10. In a process for making plastic panels having a low gloss decorative coating transfer-laminated to an extruded plastic sheet in which the decorative coating includes a protective outer layer made from a blended fluoropolymer and acrylic resinous material which provides the low gloss surface characteristics of the finished panel, the improvement comprising:

extruding a plastic sheet under heat through an extruder die exit opening;

providing a flexible, heat resistant polymeric carrier sheet having a matte release layer bonded to it;

continuously passing the carrier sheet in close proximity to an extrusion die of an extruder containing an extrudable material comprising a blended fluoropolymer and acrylic resinous material, and extrusion coating said resinous material from said extruder die to form a solid weatherable thermoplastic and thermoformable decorative coating as a continuous film on the matte release layer of the carrier sheet to thereby form a transfer laminate, in which the starting material for the extrusion coating step is made by first blending an acrylic resin component with a UV stabilizer material followed by blending a fluoropolymer material with the blended acrylic/UV stabilizer material;

hardening the decorative coating of the transfer laminate through an immediate temperature reduction provided by passing the decorative coating into continuous pressure contact with a cooling surface while the decorative coating is supported by the carrier sheet for cooling the decorative coating to harden it on the carrier-supported matte release layer;

applying pressure to the transfer laminate and to the extruded plastic sheet with a pressure roll on the side of the carrier opposite from the extruded sheet, said pressure being applied while the temperature of the extruded sheet is maintained sufficiently near its extrusion die exit temperature to thereby transfer the decorative coating from the carrier-supported matte release layer and bond the decorative coating to the extruded sheet; and releasing the carrier sheet and its matte release layer from the decorative coating transferred to the extruded plastic sheet, said matte release layer comprising a synthetic resinous coating dried to a film thickness and containing therein a matte agent which produces on the matte release layer a surface with a micro-roughness sufficient to transfer a low surface gloss level to the outer surface of the transferred decorative coating.

11. The process according to claim 10 in which the decorative coating comprises a continous paint coat containing a pigment at a level sufficient to retard UV degradation of the extruded sheet.

12. The process according to claim 10 in which the decorative coating comprises an optically clear transparent first layer in contact with the matte release layer and a pigmented second layer in thin film form bonded to the first layer, and in which at least the first layer is extrusion coated onto the matte release layer.

13. The process according to claim 12 in which the pigmented second layer also is extrusion coated onto the extruded first layer.

14. The process according to claim 12 in which the first layer and second layer are coextruded onto the matte release layer.

15. The process according to claim 12 in which the plastic sheet is extruded as a coextrusion of a supportive thermoformable polymeric sheet and a primer layer, and in which the transfer laminate is adhered to the primer side of the coextrusion.

16. The process according to claim 10 including extruding the decorative coating at a temperature above 350° F. followed by passing the decorative coating into contact with a chill roll having a temperature at or below about 85° F., to harden the decorative coating within an elapsed time of less than about four seconds.

17. The process according to claim 10 in which the extruded decorative coating comprises a blend of from about 50% to about 70% polyvinylidene fluoride (PVDF) and from about 30% to about 50% acrylic resin, by weight of the total solids contained in the decorative coating composition.

18. The process according to claim 17 in which the PVDF component comprises an extrusion grade PVDF copolymer.

19. The process according to claim 10 in which the cooling surface comprises a chill roll operated at a temperature at or below about 85° F., in which extrusion temperature of the decorative coating material is greater than about 340° F., in which the decorative coating is extruded at a film thickness from about 0.1 mil to about 3 mils, and in which extrusion rate is greater than about 200 ft/min.

20. The process according to claim 10 in which the cooling surface comprises a chill roll operated at a temperature at or below about 85° F., and in which the elapsed chill time of the decorative coating is less than about four seconds.

21. The process according to claim 10 in which the heat generated within the extruded material from the extruder is controlled to a temperature below the gel formation temperature of the polymers contained in the extruded material.

22. The process according to claim 10 in which the starting material for the extrusion step is made by first blending an acrylic resin component and a UV stabilizer material in a first extrusion step, followed by blending a polyvinylidene fluoride (PVDF) material with the extruded acrylic/UV stabilizer material in a second extrusion step.

23. The process according to claim 22 in which the extrusion temperature of the first extrusion step is higher than the extrusion temperature of the second extrusion step.

24. The process according to claim 18 in which compatibility of the PVDF and acrylic components is enhanced by closely matching their respective temperature/viscosity profiles.

25. The process according to claim 10 in which the surface gloss transferred to the decorative coating has a 75° gloss level of less than about 20 gloss units.

26. The process according to claim 10 in which the extrudable material has a heat of extrusion and in which the polymeric carrier sheet maintains an essentially inelastic state under the heat of extrusion of the decorative coating.

27. In a process for making a decorative transfer sheet suitable for transfer lamination to substrate sheet for applying a low gloss decorative coating to the substrate sheet, in which the deocrative coating includes a protective outer layer transfer-laminated to the extruded plastic sheet and in which the outer layer is made from a blended flouropolymer and acrylic resinous material which provides the low gloss surface characteristics of the finished panel, the improvement comprising:

providing a flexible, heat-resistant polymeric carrier sheet having a matte release layer bonded to it;

continously passing the carrier sheet in close proximity to an extrusion die of an extruder containing an extrudable polymeric material comprising a blended fluoropolymer and acrylic resinous material having a heat of extrusion, and extrusion coating said resinous material, from the extruder die, to form a solid thermoplastic and thermoformable weatherable polymeric decorative coating as a continous film on the matte release layer of the carrier sheet to thereby form a transfer laminate, the carrier sheet maintaining an essentially inelastic state under said heat of extrusion, in which the starting material for the extrusion coating step is made by first blending an acryclic resin component with a UV stablizer material followed by blending a fluoropolymer material with the blended acrylic/UV stabilizer material;

immediately passing the decorative coating of the transfer laminate into continuous pressure contact with a cooling surface while the decorative coating is supported by the carrier sheet for removing excess heat from the decorative coating to harden it on the carrier-supported matte release layer while causing the extruded film to replicate the matte surface of the carrier sheet; and thererafter applying one or more color coat layers to the side of the decorative coating opposite from the carrier sheet, the carrier sheet being releasable from the deocrative coating for exposing the decorative coating as a low gloss matte surface through which said one or more decorative color coats are visible.

28. The process according to claim 27 in which the extruded decorative coating comprises a blend of from about 50% to about 70% polyvinylidene fluoride (PVDF) and from about 30% to about 50% acrylic resin, by weight of the total solids contained in the decorative coating composition.

29. The process according to claim 28 in which the PVDF component comprises an extrusion grade PVDF copolymer.

30. The process according to claim 27 in which the cooling surface comprises a chill roll operated at a temperature at or below about 85° F., in which extrusion temperature of the decorative coating material is greater than about 340° F., in which the first layer is extruded at a film thickness from about 0.1 mil to about 3 mils, and in which extrusion rate is greater than about 200 ft/min.

31. The process according to claim 27 in which the cooling surface comprises a chill roll operated at a temperature at or below about 85° F., and in which the elapsed chill time of the decorative coating is less than about four seconds.

32. The process according to claim 27 in which heat generated within the extruded material from the extruder is controlled to a temperature below the gel formation temperature of the polymers contained in the extruded material.

33. The process according to claim 27 in which the starting material for the extrusion step is made by first blending an acrylic resin component and a UV stabilizer material in a first extrusion step, followed by blending a polyvinylidene fluoride material (PVDF) with the extruded acrylic/UV stabilizer material in a second extrusion step.

34. The process according to claim 33 in which the extrusion temperature of the first extrusion step is higher than the extrusion temperature of the second extrusion step.

35. The process according to claim 29 in which compatibility of the PVDF and acrylic components is enhanced by closely matching their respective temperature/viscosity profiles.

36. The process according to claim 27 in which the surface gloss transferred to the decorative coating has a 75° gloss level of less than about 20 gloss units.

37. In a process for making a decorative transfer sheet suitable for transfer lamination to a substrate sheet for applying a low-gloss decorative coating to the substrate sheet, in which the decorative coating includes a protective outer layer transfer-laminated to the extruded plastic sheet and in which the outer layer is made from a blended fluoropolymer and acrylic resinous material which provides the low gloss surface characteristics of the finished panel, the improvement comprising:

providing a flexible, heat-resistant polymeric carrier sheet having a matte release layer bonded to it;

continuously passing the carrier sheet in close proximity to an extrusion die of an extruder containing an extrudable polymeric material comprising a blended fluoropolymer and acrylic resinous material, and extrusion coating said resinous material, from the extruder die, to form a solid thermoplastic and thermoformable weatherable polymeric decorative coating as a continuous film on the matte release layer of the carrier sheet to thereby form a transfer laminate, in which the extruded decorative coating from the extruder is controlled to a temperature below the gel formation temperature of the polymers contained in the extruded material, and in which the starting material for the extrusion coating step is made by first blending an acrylic resin component with a UV stabilizer material followed by blending a fluoropolymer material with the blended acrylic/UV stabilizer material;

immediately passing the decorative coating of the transfer laminate into continuous pressure contact with a cooling surface while the decorative coating is supported by the carrier sheet for removing excess heat from the decorative coating to harden it on the carrier-supported matte release layer while causing the extruded film to replicate the matte surface of the carrier sheet; and thereafter applying one or more color coat layers to the side of the decorative coating opposite from the carrier sheet, the carrier sheet being releasable from the decorative coating for exposing the decorative coating as a low gloss matte surface through which said one or more decorative color coats are visible.

38. The process according to claim 37 in which the starting material for the extrusion step is made by first blending an acrylic resin component and a UV stabilizer material in a first extrusion step, followed by blending a polyvinylidene fluoride material (PVDF) with the extruded acrylic resin/UV stabilizer material in a second extrusion step.

39. The process according to claim 38 in which the extrusion temperature of the first extrusion step is higher than the extrusion temperature of the second extrusion step.

40. In a process for making a decorative transfer sheet suitable for transfer lamination to a substrate sheet for applying a low gloss decorative coating to the substrate sheet, in which the decorative coating includes a protective outer layer transfer-laminated to the extruded plastic sheet and in which the outer layer is made from a blended fluoropolymer and acrylic resinous material which provides the low gloss surface characteristics of the finished panel, the improvement comprising:

providing a flexible, heat-resistant polymeric carrier sheet having a matte release layer bonded to it;

continuously passing the carrier sheet in close proximity to an extrusion die of an extruder containing an extrudable polymeric material comprising a blended fluoropolymer and acrylic resinous material, and extrusion coating said resinous material, from the extruder die, to form a solid thermoplastic and thermoformable weatherable polymeric decorative coating as a continuous film on the matte release layer of the carrier sheet to thereby form a transfer laminate, in which the starting material for the extrusion coating step is made by first blending an acrylic resin component with a UV stabilizer material followed by blending a fluoropolymer material with the blended acrylic/UV stabilizer material;

immediately passing the decorative coating of the transfer laminate into continuous pressure contact with a cooling surface while the decorative coating is supported by the carrier sheet for removing excess heat from the decorative coating to harden it on the carrier-supported matte release layer while causing the extruded film to replicate the matte surface of the carrier sheet, in which the cooling surface comprises a rotating chill roll and the extruded coating has sufficient melt strength to be extrusion coated at a film thickness of about 0.1 mil to about 3 mils onto the carrier sheet traveling at a rate of at least about 100 ft/min during said extrusion coating and temperature reduction steps; and thereafter applying one or more color coat layers to the side of the decorative coating opposite from the carrier sheet, the carrier sheet being releasable from the decorative coating for exposing the decorative coating as a low gloss matte surface through which said one or more decorative color coats are visible.

41. The process according to claim 40 in which the extruded decorative coating comprises a blend of from about 50% to about 70% polyvinylidene fluoride (PVDF) and from about 30% to about 50% acrylic resin, by weight of the total solids contained in the decorative coating composition.

42. The process according to claim 41 in which the PVDF component comprises an extrusion grade PVDF copolymer.

43. The process according to claim 42 in which compatability of the PVDF and acrylic components is enhanced by closely matching their respective temperature/viscosity profiles.

44. The process according to claim 40 in which the carrier sheet travels at a rate of at least 200 ft/min.

45. In a process for making a decorative transfer sheet suitable for transfer lamination to a substrate sheet for applying a low gloss decorative coating to the substrate sheet, in which the decorative coating includes a protective outer layer transfer-laminated to the extruded plastic sheet and in which the outer layer is made from a blended fluoropolymer and acrylic resinous material which provides the low gloss surface characteristics of the finished panel, the improvement comprising:

providing a flexible, heat-resistant polymeric carrier sheet having a matte release layer bonded to it;

continuously passing the carrier sheet in close proximity to an extrusion die of an extruder containing an extrudable polymeric material comprising a blended fluoropolymer and acrylic resinous material, and extrusion coating said resinous material, from the extruder die, to form a solid thermoplastic and thermoformable weatherable polymeric decorative coating as a continuous film on the matte release layer of the carrier sheet to thereby form a transfer laminate, in which the starting material for the extrusion coating step is made by first blending an acrylic resin component with a UV stabilizer material followed by blending a fluoropolymer material with the blended acrylic/UV stabilizer material;

immediately passing the decorative coating of the transfer laminate into continuous pressure contact with a cooling surface while the decorative coating is supported by the carrier sheet for removing excess heat from the decorative coating to harden it on the carrier-supported matte release layer while causing the extruded film to replicate the matte surface of the carrier sheet, in which: (1) the extruded decorative coating comprises a blend of from about 50% to about 70% polyvinylidene fluoride (PVDF) and from about 30% to about 50% acrylic resin, by weight of the total solids contained in the decorative coating composition, (2) the PVDF component comprises an extrusion grade PVDF copolymer, (3) the cooling surface comprises a chill roll operated at a temperature at or below about 75° F., (4) extrusion temperature of the decorative coating material is greater than about 340° F., (5) the first layer is extruded at a film thickness from about 0.1 mil to about 3 mils, and (6) extrusion rate is greater than about 200 ft/min; and thereafter applying one or more color coat layers to the side of the decorative coating opposite from the carrier sheet, the carrier sheet being releasable from the decorative coating for exposing the decorative coating as a low gloss matte surface through which said one or more decorative color coats are visible.

46. In a process for making a decorative transfer sheet suitable for transfer lamination to a substrate sheet for applying a low gloss decorative coating to the substrate sheet, in which the decorative coating includes a protective outer layer transfer-laminated to the extruded plastic sheet and in which the outer layer is made from a blended fluoropolymer and acrylic resinous material which provides the low gloss surface characteristics of the finished panel, the improvement comprising:

extruding a plastic sheet under heat through an extruder die exit opening;

providing a flexible, heat resistant polymeric carrier sheet having a matte release layer bonded to it;

continuously passing the carrier sheet in close proximity to an extrusion die of an extruder containing an extrudable material comprising a blended fluoropolymer and acrylic resinous material, and extrusion coating said resinous material from said extruder die to form a solid weatherable thermoplastic and thermoformable decorative coating as a continuous film on the matte release layer of the carrier sheet to thereby form a transfer laminate, in which the heat generated within the extruded material from the extruder is controlled to a temperature below the gel formation temperature of the polymers contained in the extruded material, and in which the starting material for the extrusion coating step is made by first blending an acrylic resin component with a UV stabilizer material followed by blending a fluoropolymer material with the blended acrylic/UV stabilizer material;

hardening the decorative coating of the transfer laminate through an immediate temperature reduction provided by passing the decorative coating into continuous pressure contact with a cooling surface while the decorative coating is supported by the carrier sheet for cooling the decorative coating to harden it on the carrier-supported matte release layer;

applying pressure to the transfer laminate and to the extruded plastic sheet with a pressure roll on the side of the carrier opposite from the extruded sheet, said pressure being applied while the temperature of the extruded sheet is maintained sufficiently near its extrusion die exit temperature to thereby transfer the decorative coating from the carrier-supported matte release layer and bond the decorative coating to the extruded sheet; and releasing the carrier sheet and its matte release layer from the decorative coating transferred to the extruded plastic sheet, said matte release layer comprising a synthetic resinous coating dried to a film thickness and containing therein a matte agent which produces on the matte release layer a surface with a micro-roughness sufficient to transfer a low surface gloss level to the outer surface of the transferred decorative coating.

47. The process according to claim 46 in which the starting material for the extrusion step is made by first blending an acrylic resin component and a UV stabilizer material in a first extrusion step, followed by blending a polyvinylidene fluoride (PVDF) material with the extruded acrylic/UV stabilizer material in a second extrusion step.

48. A process for making plastic panels with a decorative surface, comprising:

extruding a plastic sheet under heat through an extruder die exit opening;

providing a flexible, heat resistant polymeric carrier sheet having a matte release layer bonded to it;

continuously passing the carrier sheet in close proximity to an extrusion die of an extruder containing an extrudable material, and extrusion coating from said extruder die a solid weatherable thermoplastic and thermoformable decorative coating as a continuous film on the matte release layer of the carrier sheet to form a transfer laminate;

hardening the decorative coating of the transfer laminate through an immediate temperature reduction provided by passing the decorative coating into continuous pressure contact with a cooling surface while the decorative coating is supported by the carrier sheet for cooling the decorative coating to harden it on the carrier-supported matte release layer;

applying pressure to the transfer laminate and to the extruded plastic sheet with a pressure roll on the side of the carrier opposite from the extruded sheet, said pressure being applied while the temperature of the extruded sheet is maintained sufficiently near its extrusion die exit temperature to thereby transfer the decorative coating from the carrier-supported matte release layer and bond the decorative coating to the extruded sheet; and releasing the carrier sheet and its matte release layer from the decorative coating transferred to the extruded plastic sheet, said matte release layer comprising a synthetic resinous coating dried to a film thickness and containing therein a matte agent which produces on the matte release layer a surface with a micro-roughness sufficient to transfer a low surface gloss level to the outer surface of the transferred decorative coating;

in which the starting material for the extrusion step is made by first blending an acrylic resin component with a UV stabilizer material in a first extrusion step followed by blending a fluoropolymer material with the extruded acrylic/UV stabilizer material in a second step.

49. The process according to claim 48 in which the extrusion temperature of the first extrusion step is higher than the extrusion temperature of the second extrusion step.

50. A process for making a decorative transfer sheet suitable for transfer lamination to a substrate sheet for applying a low gloss decorative surface to the substrate sheet, the process comprising:

providing a flexible, heat-resistant polymeric carrier sheet having a matte release layer bonded to it;

continuously passing the carrier sheet in close proximity to an extrusion die of an extruder containing an extrudable polymeric material having a heat of extrusion; and extrusion coating, from the extruder die, a solid thermoplastic and thermoformable weatherable polymeric decorative coating as a continuous film on the matte release layer of the carrier sheet to form a transfer laminate, the carrier sheet maintaining an essentially inelastic state under said heat of extrusion;

immediately passing the decorative coating of the transfer laminate into continuous pressure contact with a cooling surface while the decorative coating is supported by the carrier sheet for removing excess heat from the decorative coating to harden it on the carrier-supported matte release layer while causing the extruded film to replicate the matte surface of the carrier sheet; and thereafter applying one or more color coat layers to the side of the decorative coating opposite from the carrier sheet, the carrier sheet being releasable from the decorative coating for exposing the decorative coating as a low gloss matte surface through which said one or more decorative color coats are visible, in which the starting material for the extrusion step is made by first blending an acrylic resin component and a UV stabilizer material in a first extrusion step, followed by blending a polyvinylidene fluoride material (PVDF) with the extruded acrylic/UV stabilizer material in a second extrusion step.

51. The process according to claim 50 in which the extrusion temperature of the first extrusion step is higher than the extrusion temperature of the second extrusion step.

52. A process for making a decorative transfer sheet suitable for transfer lamination to a substrate sheet for applying a low-gloss decorative surface to the substrate sheet, the process comprising:

providing a flexible, heat-resistant polymeric carrier sheet having a matte release layer bonded to it;

continuously passing the carrier sheet in close proximity to an extrusion die of an extruder containing an extrudable polymeric material; and extrusion coating, from the extruder die, a solid thermoplastic and thermoformable weatherable polymeric decorative coating as a continuous film on the matte release layer of the carrier sheet to form a transfer laminate, in which the extruded decorative coating from the extruder is controlled to a temperature below the gel formation temperature of the polymers contained in the extruded material;

immediately passing the decorative coating of the transfer laminate into continuous pressure contact with a cooling surface while the decorative coating is supported by the carrier sheet for removing excess heat from the decorative coating to harden it on the carrier-supported matte release layer while causing the extruded film to replicate the matte surface of the carrier sheet; and thereafter applying one or more color coat layers to the side of the decorative coating opposite from the carrier sheet, the carrier sheet being releasable from the decorative coating for exposing the decorative coating as a low gloss matte surface through which said one or more decorative color coats are visible, in which the starting material for the extrusion step is made by first blending an acrylic resin component and a UV stabilizer material in a first extrusion step, followed by blending a polyvinylidene fluoride material (PVDF) with the extruded acrylic resin/UV stabilizer material in a second extrusion step.

53. The process according to claim 52 in which the extrusion temperature of the first extrusion step is higher than the extrusion temperature of the second extrusion step.

54. The process according to claim 10 including predrying the extrudable material prior to the extrusion coating step.

55. The process according to claim 10 including extruding the resinous material at a temperature in the range of about 340° F. to about 430° F.

56. The process according to claim 27 including predrying the extrudable material prior to the extrusion coating step.

57. The process according to claim 27 including extruding the resinous material at a temperature in the range of about 340° F. to about 430° F.

58. The process according to claim 48 including predrying the extrudable material prior to She extrusion coating step.

59. The process according to claim 48 including extruding the resinous material at a temperature in the range of about 340° F. to about 430° F.

60. The process according to claim 52 including predrying the extrudable material prior to the extrusion coating step.

61. The process according to claim 52 including extruding the resinous material at a temperature in the range of about 340° F. to about 430° F.

* * * * *